(12) United States Patent
Nobuta et al.

(10) Patent No.: US 6,809,836 B1
(45) Date of Patent: Oct. 26, 2004

(54) IMAGE COMMUNICATION APPARATUS AND ITS CONTROL METHOD

(75) Inventors: Hiroshi Nobuta, Yamato (JP); Yasuhide Ueno, Hino (JP); Susumu Matsuzaki, Toride (JP); Takeshi Toyama, Hiratsuka (JP); Muneki Nakao, Kashiwa (JP); Naoki Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,836

(22) Filed: Sep. 24, 1999

(30) Foreign Application Priority Data

| Oct. 2, 1998 | (JP) | 10-281615 |
| Oct. 2, 1998 | (JP) | 10-281616 |
| Oct. 2, 1998 | (JP) | 10-281617 |
| Oct. 2, 1998 | (JP) | 10-281618 |
| Oct. 2, 1998 | (JP) | 10-281619 |
| Oct. 27, 1998 | (JP) | 10-306161 |

(51) Int. Cl.$^7$ .............................................. H04N 1/00
(52) U.S. Cl. ...................................... 358/1.9; 358/1.15
(58) Field of Search ............................... 358/1.9, 1.15, 358/1.16–1.17, 523–524, 404, 444

(56) References Cited

U.S. PATENT DOCUMENTS

| 4,954,910 A | 9/1990 | Ueno .......................... 358/296 |
| 5,220,417 A | 6/1993 | Sugiura |
| 5,485,283 A | 1/1996 | Kaneko |
| 5,617,220 A | 4/1997 | Ueno .......................... 358/434 |
| 5,696,598 A | 12/1997 | Yoshida et al. |
| 5,726,769 A | 3/1998 | Imai et al. ................... 358/442 |
| 5,828,466 A | 10/1998 | Imai et al. ................... 358/404 |
| 5,930,004 A | 7/1999 | Imai et al. ................... 358/442 |
| 5,963,623 A | * 10/1999 | Kim ....................... 379/100.01 |
| 6,075,616 A | * 6/2000 | Nishi ........................ 358/1.15 |
| 6,118,546 A | * 9/2000 | Sanchez et al. .............. 358/1.6 |
| 6,118,551 A | * 9/2000 | Park ............................ 358/405 |
| 6,124,942 A | * 9/2000 | Ichinowatari ............... 358/1.17 |
| 6,130,760 A | * 10/2000 | Nickerson ................... 358/442 |
| 6,164,740 A | 12/2000 | Hirai et al. ..................... 347/3 |
| 6,288,791 B1 | * 9/2001 | Minamizawa ............... 358/1.15 |

FOREIGN PATENT DOCUMENTS

| JP | 7-226817 | 8/1995 |
| JP | 10-123789 | 5/1998 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

Demand for an inexpensive color facsimile apparatus is expected not in the business field but in home use, and a product which is easy to operate and use is required in consideration of home use. Such color facsimile apparatus, i.e., an image communication apparatus has a communication means for communicating with a partner terminal via a line, a DRAM (118) for storing image information received by the communication means, a management means for managing the image information stored in the DRAM (118), decoding means for decoding the image information stored in the DRAM (118) into image data to be recorded on a recording paper sheet, and a recording unit (120) for recording a visible image on a recording paper sheet on the basis of the decoded image data using a selected attached ink cartridge. A CPU (11) of the image communication apparatus counts C1 indicating the number of non-recorded color images stored in the DRAM (118), M1 indicating the number of non-recorded monochrome images, C2 indicating the number of recorded color images, and M2 indicating the number of recorded monochrome images. When a value C1+M1 is not zero, the CPU displays a message indicating that a new image is stored in the DRAM (118) using a first display unit on a control panel (122). When the value C1 is not zero, the CPU displays a message indicating that a new image is stored in the DRAM (118) using a second display unit independent from the first display unit.

27 Claims, 35 Drawing Sheets

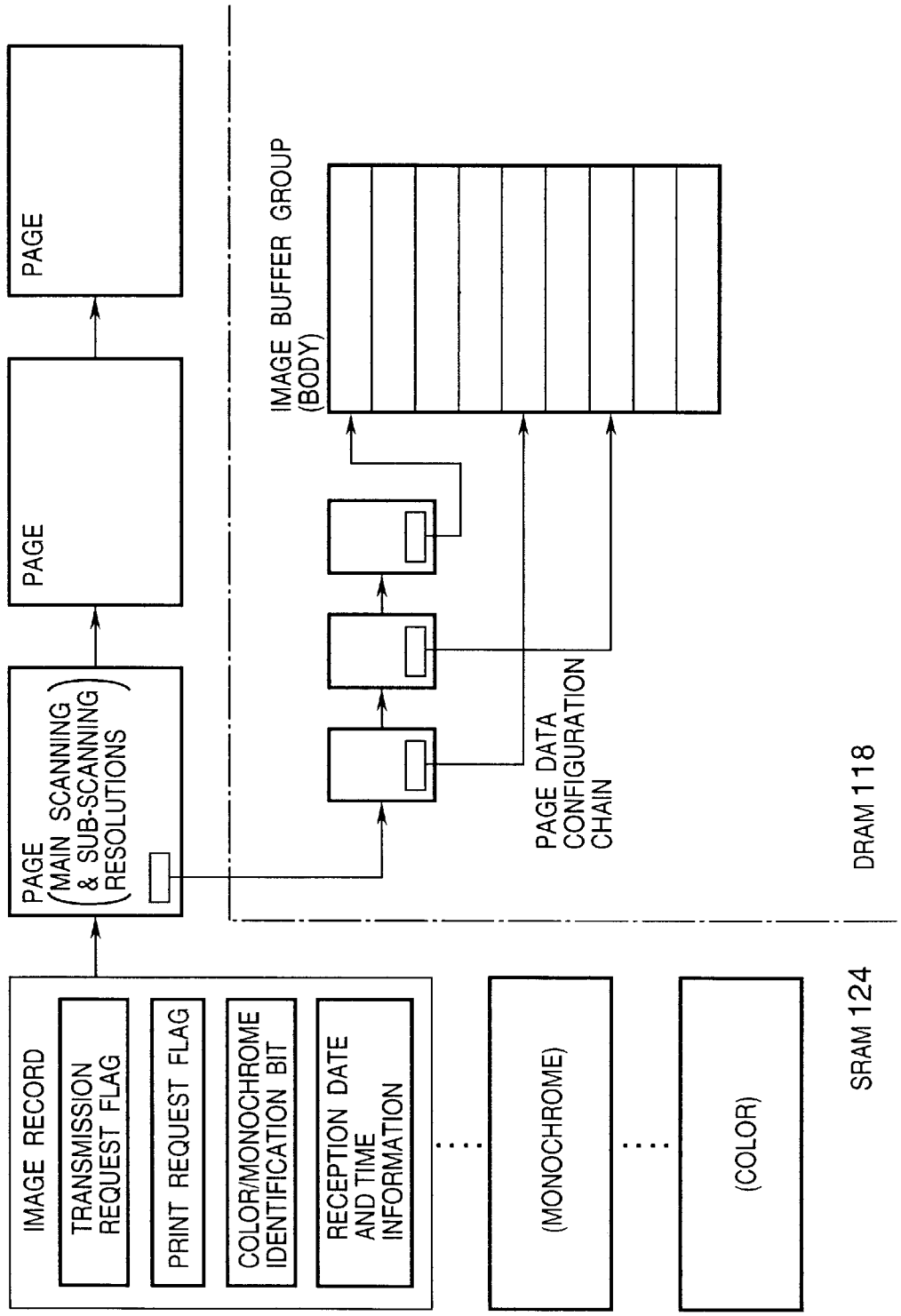

FIG. 5A

```
loop_1
    INITIALIZE C1, C2, M1 AND M2 COUNTERS                          ···S310
    loop_2 SEARCH ALL IMAGE RECORDS                                ···S311
        if MEMORY-RECEIVED IMAGE RECORD PRESENT?                   ···S312
            if NOT PRINTED?                                        ···S313
                if COLOR IMAGE?                                    ···S314
                    NUMBER OF NON-PRINTED RECEIVED
                    COLOR IMAGES C1++                              ···S315
                else
                    NUMBER OF NON-PRINTED RECEIVED
                    MONOCHROME IMAGES M1++                         ···S316
            else
                if COLOR IMAGE?                                    ···S317
                    NUMBER OF PRINTED RECEIVED
                    COLOR IMAGES C2++                              ···S318
                else
                    NUMBER OF PRINTED RECEIVED
                    MONOCHROME IMAGES M2++                         ···S319
    end_loop_2 if NON-PRINTED IMAGE PRESENT?                                  ···S320
        FLICKER "RECEPTION/PRINT" KEY
        (OR COLOR MODE INDICATOR)                                  ···S321
    if (C1+C2) > 0                                                 ···S322
        DISPLAY NUMBER OF RECEIVED COLOR IMAGES (C1+C2)            ···S323
    if (M1+M2) > 0                                                 ···S324
        DISPLAY NUMBER OF RECEIVED MONOCHROME IMAGES(M1+M2)        ···S325
end_loop_1
```

FIG. 6

MAY 20 12 : 00

RECEIVED COLOR IMAGE = 2

FIG. 7

MAY 20 12 : 00

RECEIVED FAX = 2

```
┌─────────────────────────────┐
│                             │
│      MAY 20 12 : 00         │
│                             │
│     RECEIVED FAX = 2        │
│                             │
└─────────────────────────────┘
```

ALTERNATE DISPLAY

```
┌─────────────────────────────┐
│                             │
│      MAY 20 12 : 00         │
│                             │
│  RECEIVED COLOR IMAGE = 2   │
│                             │
└─────────────────────────────┘
```

FIG. 9

| (RECEIVED IMAGE TYPE) | (RECEPTION DATE) | (PRINT STATE) |
|---|---|---|
| RECEIVED MONOCHROME IMAGE 1 | MAY 1  12:00 | NOT PRINTED |
| RECEIVED COLOR IMAGE 1 | MAY 2  15:00 | NOT PRINTED |
| RECEIVED MONOCHROME IMAGE 2 | MAY 4  17:00 | NOT PRINTED |
| RECEIVED COLOR IMAGE 2 | MAY 5  18:00 | NOT PRINTED |

F I G. 18
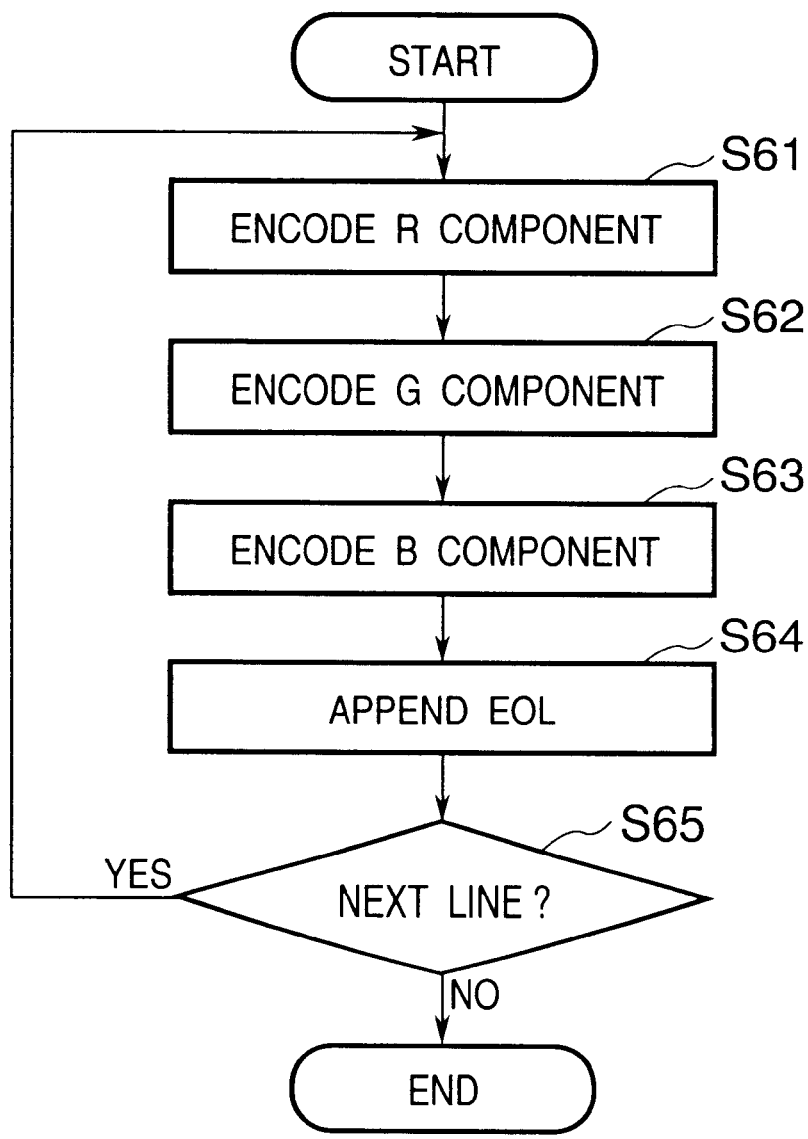

FIG. 26

| Field | | | | | | | |
|---|---|---|---|---|---|---|---|
| protocol-version | | | | | | | FIX VERSION NUMBER |
| file-name | IMPLICIT | | | Filename-Attribute | | SEQUENCE GraphicString | |
| permitted-action | IMPLICIT | | | Permitted-Action-Attribute | BIT STRING | | |
| contents-type | | | | Contents-type-Attribute | CHOICE OBJECT IDENTIFIER | | |
| storage-account | IMPLICIT | GraphicString | | | | | |
| data-and-time-of-creation | IMPLICIT | | GeneralizedTime | | | | SCANNING START TIME |
| data-and-time-of-last-modification | IMPLICIT | | GeneralizedTime | | | | |
| data-and-time-of-last-read-access | IMPLICIT | | GeneralizedTime | | | | |
| identity-of-creator | IMPLICIT | GraphicString | | | | | |
| identity-of-last-modifer | IMPLICIT | GraphicString | | | | | |
| identity-of-last-reader | IMPLICIT | GraphicString | | | | | |
| filesize | IMPLICIT | INTEGER | | | | | FILE SIZE |
| future-filesize | IMPLICIT | INTEGER | | | | | |
| access-control | | | | Access-control-Attribute | | | |
| legal-qualification | IMPLICIT | GraphicString | | | | | |
| private-use | IMPLICIT | | | Private-Use-Attribute | | SEQUENCE manufacture-values | |
| structure | | | | OBJECT IDENTIFIER | | | |
| application-reference | | | | General-Identifier | CHOICE OBJECT IDENTIFIER | | |
| | | | | | SEQUENCE GraphicString | | |
| machine | IMPLICIT | SEQUENCE | GraphicString | | | | |
| operating-system | IMPLICIT | | | OBJECT IDENTIFIER | | | |
| recipient | IMPLICIT | SEQUENCE | GraphicString | | | | |
| character-set | IMPLICIT | SEQUENCE | GraphicString | | | | |
| compression | | | | General-Identifier | CHOICE OBJECT IDENTIFIER | | |
| | | | | | SEQUENCE GraphicString | | |
| environment | IMPLICIT | SEQUENCE | GraphicString | | | | |
| pathname | IMPLICIT | SEQUENCE | GraphicString | | | | |
| user-visible-string | IMPLICIT | SEQUENCE | GraphicString | | | | |
| data-file-content | CHOICE | EXTERNAL | | | | | DO NOT USE |
| | | ANY | | | | | DECLARE ACCORDING TO X208 |

| ITEM | BFT HEADER | | |
|---|---|---|---|
| | COMMENT | BRIEF USE METHOD | REMARKS |
| protocol-version | | | |
| file-name | FILE NAME (CHARACTER STRING) | CAN BE FILLED BY USER UPON TRANSMISSION | THANKSxxxyyy.CDP (xxx IS TIME INFORMATION, yyy IS TOTAL COUNTER VALUE) |
| contents-type | DESCRIPTION METHOD OF CONTENTS CHOICE(OBJ ID or ANY OP) SEE Application-reference FOR DETAILS | unstructured-binary FIXED | iso(0)standard(40)8571(8571)document-type(5)unstructured-binary(3) |
| data-and-time-of-creation | TIME (STANDARD DESCRIPTION) | USE IMAGE SCANNING TIME | EX. 13 : 15, OCTOBER 30, 1998 |
| identity-of-creator | CHARACTER STRING | | COPY ABBREVIATED NAME OF USER ALREADY REGISTERED IN THIS APPARATUS |
| filesize | FILE SIZE | THIS ITEM IS NOT AVAILABLE IN ORIGINAL IMAGE TRANSMISSION | |
| application-reference | G.I. | SELECT SEQUENCE CHARACTER STRING AND DECLARE | IMAGE-001,FDM=001/FAX-ORG. |
| machine | SEQUENCE CHARACTER STRING | | BJ-FAX Color1 |
| character-set | OBJ. ID | | |
| compression | G.I. | SELECT SEQUENCE CHARACTER STRING AND DECLARE | DPCM Ver.1 RGB/W=360/L=540/DPIH=90/DPIV=90 |

Diagnostic Information : =<Length><Diagnostic message>

IMAGE COMMUNICATION APPARATUS AND ITS CONTROL METHOD

BACKGROUND OF THE INVENTION

1. Field of the Invention

The present invention relates to an image communication method and its control method and, more particularly, to an image communication apparatus such as a telephone terminal having a facsimile communication function or the like, and its control method.

2. Description of Related Art

Various proposals have been made in relation to facsimile apparatuses for transmitting/receiving color images. In the ITU-T recommendation as the facsimile international standards as well, color facsimile systems (G3 and G4 standards) have been standardized recently, and are projected to prevail in the future.

Most of existing color facsimile apparatuses are large in size and expensive. However, since an inexpensive ink-jet color printer can be used in a recording unit, low-cost color facsimile apparatuses will appear soon.

Demand for an inexpensive color facsimile apparatus is expected not in the business field but in home use, and a product which is easy to operate and use is required for home use. However, in a certain inexpensive ink-jet color printer, ink cartridges must be exchanged in correspondence with color or monochrome print, and the operability upon printing a color or monochrome received image must be taken into consideration.

A color facsimile apparatus which adopts an ink-jet recording unit can record both color and monochrome images using only a color ink cartridge. For example, when a monochrome original image is to be copied, a monochrome image can be recorded using process black that expresses black by mixing one or all of inks in the color ink cartridge. Furthermore, upon recording an image received via a facsimile communication, since the received image is normally monochrome, it can be recorded using the inks in the color ink cartridge.

However, when the color ink cartridge is always attached to the recording unit, at least some of color inks are consumed even when a monochrome image is recorded. For this reason, when a color image is received and is color-recorded, the remaining ink amount of the color ink cartridge may become small, and the received color image cannot be recorded. To prevent such shortcoming, the ink cartridge may be increased in size to have a larger capacity. However, such cartridge results in a large, expensive apparatus.

In a recording unit which can exchange a monochrome ink cartridge used for recording a monochrome image, and a color ink cartridge used for recording a color image, when the image to be recorded is a color image but the attached ink cartridge is that for recording a monochrome image, the color image cannot be appropriately recorded. As a result, a recording paper sheet and ink used for recording that image are wasted.

SUMMARY OF THE INVENTION

The present invention has been made to solve the aforementioned problems, and has as its object to provide an image communication apparatus which allows the user to easily recognize the state of a memory-received image, and its control method.

In order to achieve the above object, a preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means.

Also, a preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means, further comprising notification means for notifying a count value obtained by counting the number of pieces of non-recorded image information stored in the memory, and notifying a count value obtained by counting the number of pieces of color or monochrome image information stored in the memory.

Furthermore, a preferred embodiment of the present invention discloses a controlling method for controlling an image communication apparatus which has a communication control unit for controlling a communication with a partner terminal, a memory control unit for storing image information received from the partner terminal in a memory, and a recording control unit for recording a visible image on a recording paper sheet on the basis of the image information stored in the memory by selectively using a recording material cartridge, said method comprising the step of: managing image information stored in the memory on the basis of identification information containing information indicating that recording has been done by the recording control unit.

It is another object of the present invention to provide an image communication apparatus which can control image recording on the basis of the states of memory-received color and monochrome images, and its control method.

In order to achieve the above object, a preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means, further comprising recording operation control means for controlling recording operation of image information stored in the memory by said recording control means on the basis of a count value obtained by counting the number of pieces of recorded image information stored in the memory, and identification information of image information provided by said management means.

Also, a preferred embodiment of the present invention discloses a controlling method for controlling an image communication apparatus which has a communication control unit for controlling a communication with a partner terminal, a memory control unit for storing image information received from the partner terminal in a memory, and a recording control unit for recording a visible image on a recording paper sheet on the basis of the image information stored in the memory by selectively using a recording material cartridge, said method comprising the step of: managing image information stored in the memory on the basis of identification information containing information indicating that recording has been done by the recording control unit, further comprising the steps of: counting the number of pieces of recorded image information stored in the memory; and controlling recording operation of image information stored in the memory by the recording control unit on the basis of the obtained count value and identification information of image information provided by a management unit.

It is still another object of the present invention to provide an image communication apparatus which allows the user to easily detect memory-received color and monochrome images, and its control method.

In order to achieve the above object, a preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means, further comprising notification control means for notifying a count value obtained by counting the number of pieces of recorded image information stored in the memory.

Also, a preferred embodiment of the present invention discloses a controlling method for controlling an image communication apparatus which has a communication control unit for controlling a communication with a partner terminal, a memory control unit for storing image information received from the partner terminal in a memory, and a recording control unit for recording a visible image on a recording paper sheet on the basis of the image information stored in the memory by selectively using a recording material cartridge, said method comprising the step of: managing image information stored in the memory on the basis of identification information containing information indicating that recording has been done by the recording control unit, further comprising the steps of: counting the number of pieces of recorded image information stored in the memory; and notifying the obtained count value.

It is still another object of the present invention to provide an image communication apparatus which can notify the user of the necessity of exchange of a recording material cartridge upon recording a received image, and its control method.

In order to achieve the above object, a preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means, further comprising notification control means for notifying necessity of exchange of a recording material cartridge currently used by said recording control means when identification information of image information provided by said management means indicates that both color image information and monochrome image information are stored in the memory.

Also, a preferred embodiment of the present invention discloses a controlling method for controlling an image communication apparatus which has a communication control unit for controlling a communication with a partner terminal, a memory control unit for storing image information received from the partner terminal in a memory, and a recording control unit for recording a visible image on a recording paper sheet on the basis of the image information stored in the memory by selectively using a recording material cartridge, said method comprising the step of: managing image information stored in the memory on the basis of identification information containing information indicating that recording has been done by the recording control unit, further comprising the step of: notifying necessity of exchange of a recording material cartridge currently used by the recording control unit when identification information of image information provided by a management unit indicates that both color image information and monochrome image information are stored in the memory.

It is still another object of the present invention to provide an image communication apparatus which allows the user to select whether or not he or she wants to exchange a recording material cartridge, and its control method.

A preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means, further comprising notification control means for notifying necessity of exchange of a recording material cartridge currently used by said recording control means when identification information of image information provided by said management means indicates that both color image information and monochrome image information are stored in the memory, wherein said recording control means suspends start recording operation until whether or not the currently used recording material cartridge is exchanged is selected in response to the notification.

It is still another object of the present invention to provide an image communication apparatus which can record received images including both color and monochrome images in an appropriate order, and its control method.

In order to achieve the above object, a preferred embodiment of the present invention discloses an image communication apparatus comprising: communication control means for controlling a communication with a partner terminal; memory control means for storing image information received from the partner terminal in a memory; recording control means for recording a visible image on a recording paper sheet on the basis of the image information stored in the memory by selectively using a recording material cartridge; and management means for managing image information stored in the memory on the basis of identification information containing information indicating that recording has been done by said recording control means, further comprising recording operation control means for controlling a recording order of image information stored in the memory by said recording control means on the basis of identification information of image information provided by said management means.

Also, a preferred embodiment of the present invention discloses a controlling method for controlling an image communication apparatus which has a communication control unit for controlling a communication with a partner terminal, a memory control unit for storing image information received from the partner terminal in a memory, and a recording control unit for recording a visible image on a recording paper sheet on the basis of the image information stored in the memory by selectively using a recording material cartridge, said method comprising the step of: managing image information stored in the memory on the basis of identification information containing information indicating that recording has been done by the recording control unit, further comprising the step of controlling a recording order of image information stored in the memory by the recording control unit on the basis of identification information of image information provided by a management unit.

It is still another object of the present invention to provide an image communication apparatus which records an image using a cartridge corresponding to a received image, and its control method.

It is still another object of the present invention to provide an image communication apparatus which records a received image by detecting the type of cartridge currently attached to a recording unit, and checking if recording that matches the type of received image can be done, and its control method.

In order to achieve the above objects, a preferred embodiment of the present invention discloses an image communication apparatus comprising: reception means for receiving an image from a communication partner; determination means for determining if the received image is a color or monochrome image; recording means for recording a visible image on a recording medium using a recording material in a detachably attached cartridge; detection means for detecting a type of cartridge attached to said recording means; and control means for controlling said recording means to record the received image when said determination means determines that the received image is a color image, and said detection means detects that a color recording cartridge is attached.

Also, a preferred embodiment of the present invention discloses a controlling method for controlling an image communication apparatus having a recording unit which records a visible image on a recording medium by using recording material in a cartridge detachably attached to the recording unit, said method comprising the steps of: receiving an image from a communication partner; determining if the received image is a color or monochrome image; detecting a type of cartridge attached to the recording unit; and controlling the recording unit to record the received image when it is determined that the received image is a color image, and it is detected that a color recording cartridge is attached.

It is still another object of the present invention to provide an image communication apparatus which can notify the user of information as to whether or not a cartridge is to be exchanged to record a received image, and its control method.

In order to achieve the above object, a preferred embodiment of the present invention discloses an image communication apparatus comprising: reception means for receiving an image from a communication partner; determination means for determining if the received image is a color or monochrome image; recording means for recording a visible image on a recording medium using a recording material in a detachably attached cartridge; detection means for detecting a type of cartridge attached to said recording means; and control means for controlling said recording means to record the received image when said determination means determines that the received image is a color image, and said detection means detects that a color recording cartridge is attached, wherein said control means produces an alarm that prompts to exchange the cartridge when said determination means determines that the received image is a color image, and said detection means detects that a monochrome recording cartridge is attached.

Also, a preferred embodiment of the present invention discloses a controlling method for controlling an image communication apparatus having a recording unit which records a visible image on a recording medium by using recording material in a cartridge detachably attached to the recording unit, said method comprising the steps of: receiving an image from a communication partner; determining if the received image is a color or monochrome image; detecting a type of cartridge attached to the recording unit; and controlling the recording unit to record the received image when it is determined that the received image is a color image, and it is detected that a color recording cartridge is attached, further comprising the step of producing an alarm that prompts to exchange the cartridge when it is determined that the received image is a color image, and it is detected that a monochrome recording cartridge is attached.

It is still another object of the present invention to provide an image communication apparatus which can suppress waste of a recording material by preventing unwanted image recording, and its control method.

It is still another object of the present invention to provide an image communication apparatus which can receive an image even when the type of cartridge currently attached to a recording unit does not match that of the to-be-received image, and its control method.

In order to achieve the above objects, a preferred embodiment of the present invention discloses an image communication apparatus comprising: reception means for receiving an, image from a communication partner; determination means for determining if the received image is a color or monochrome image; recording means for recording a visible image on a recording medium using a recording material in a detachably attached cartridge; detection means for detecting a type of cartridge attached to said recording means; reception control means for setting a memory reception mode and storing the received image in a memory when said determination means determines that the received image is a color image; and recording control means for controlling said recording means to record the color image stored in the memory by said reception control means.

Also, a preferred embodiment of the present invention discloses a controlling method for controlling an image communication apparatus having a recording unit which records a visible image on a recording medium by using recording material in a cartridge detachably attached to the recording unit, said method comprising the steps of: receiving an image from a communication partner; determining if the received image is a color or monochrome image; detecting a type of cartridge attached to the recording unit; setting a memory reception mode and storing the received image in a memory when it is determined that the received image is a color image; and controlling the recording unit to record the color image stored in the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view showing an image record as a management table assured on an SRAM shown in FIG. 1 to manage image data by a controller of the apparatus of the first embodiment;

FIG. 5A is a view showing an algorithm of displaying the number of images received by a facsimile apparatus;

FIG. 6 shows a display state of the total of the number of non-printed received color images and the number of printed received color images;

FIG. 7 shows a display state of the total of the number of non-printed received monochrome images and the number of printed received monochrome images;

FIG. 9 shows the storage states of received images in a DRAM;

FIG. 18 is a flow chart showing a coding process upon transmitting a color image;

FIG. 26 is a view for explaining the BFT format specified by the ITU-T recommendation (T.434);

FIG. 27 is a view for explaining the contents of a BFT header in the second embodiment;

DESCRIPTION OF THE PREFERRED EMBODIMENTS

The preferred embodiments of an image communication apparatus according to the present invention will be described in detail hereinafter with reference to the accompanying drawings.

First Embodiment

[Outline]

This apparatus is a facsimile apparatus which mounts an analog low-power type cordless telephone function, and has functions that satisfy the ITU recommendation G3 standards. In addition, the apparatus comprises a color image reading unit and color image recording unit, and has a color copy function and color image communication function. Furthermore, the apparatus is capable of automatic destination dialing by recognizing speech by a speech recognition unit.

The color image reading unit comprises a hand scanner unit detachable from the main body, and can scan not only a sheet original but also a book original. A scanning sensor of the scanner unit is a contact type color scanning sensor for line-sequentially outputting R, G, and B data. The sensor has, e.g., a scanning width corresponding to the width of a B4 sheet, and a scanning resolution of 200 dpi.

The color image recording unit is of, e.g., an ink ejection type, and prints an image on a recording paper sheet at a recording resolution of, e.g., 360 dpi by mounting one of a color cartridge which integrates C, M, Y, and K ink tanks and an ink ejection portion, and a monochrome cartridge which integrates a black ink tank and an ink ejection portion. As for the recording width of an image, the maximum recording width upon monochrome recording is B4 width independently of the types of cartridges attached, but is A4 width only upon color recording with the color cartridge attached.

As for communication, the apparatus has a maximum communication rate of 9,600 bps in the G3 mode, and has an ECM mode as an errored frame re-send function in image transmission.

Figure 1:
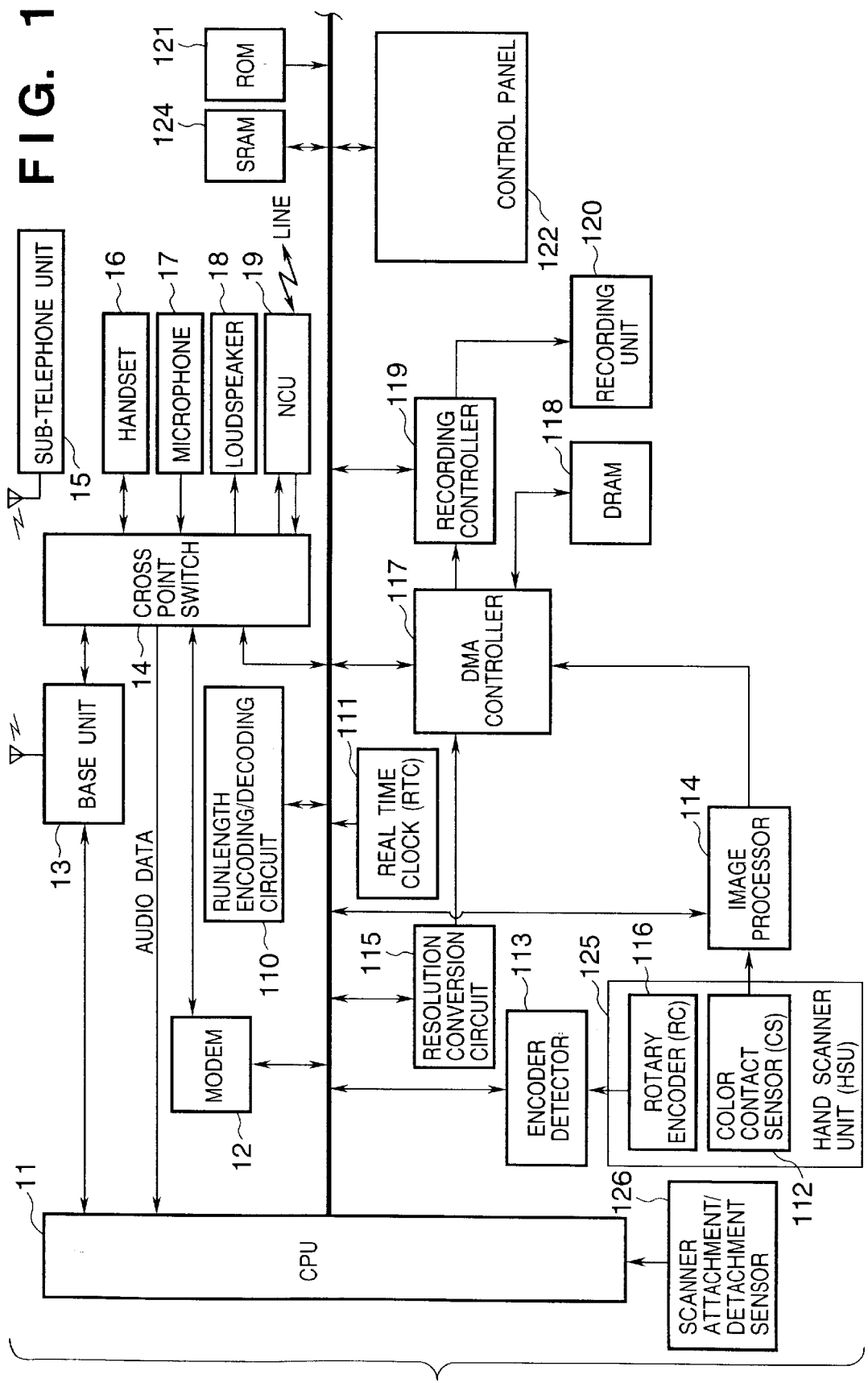
FIG. 1 is a block diagram showing the system arrangement of an apparatus according to the first embodiment of the present invention.
Figure 2:
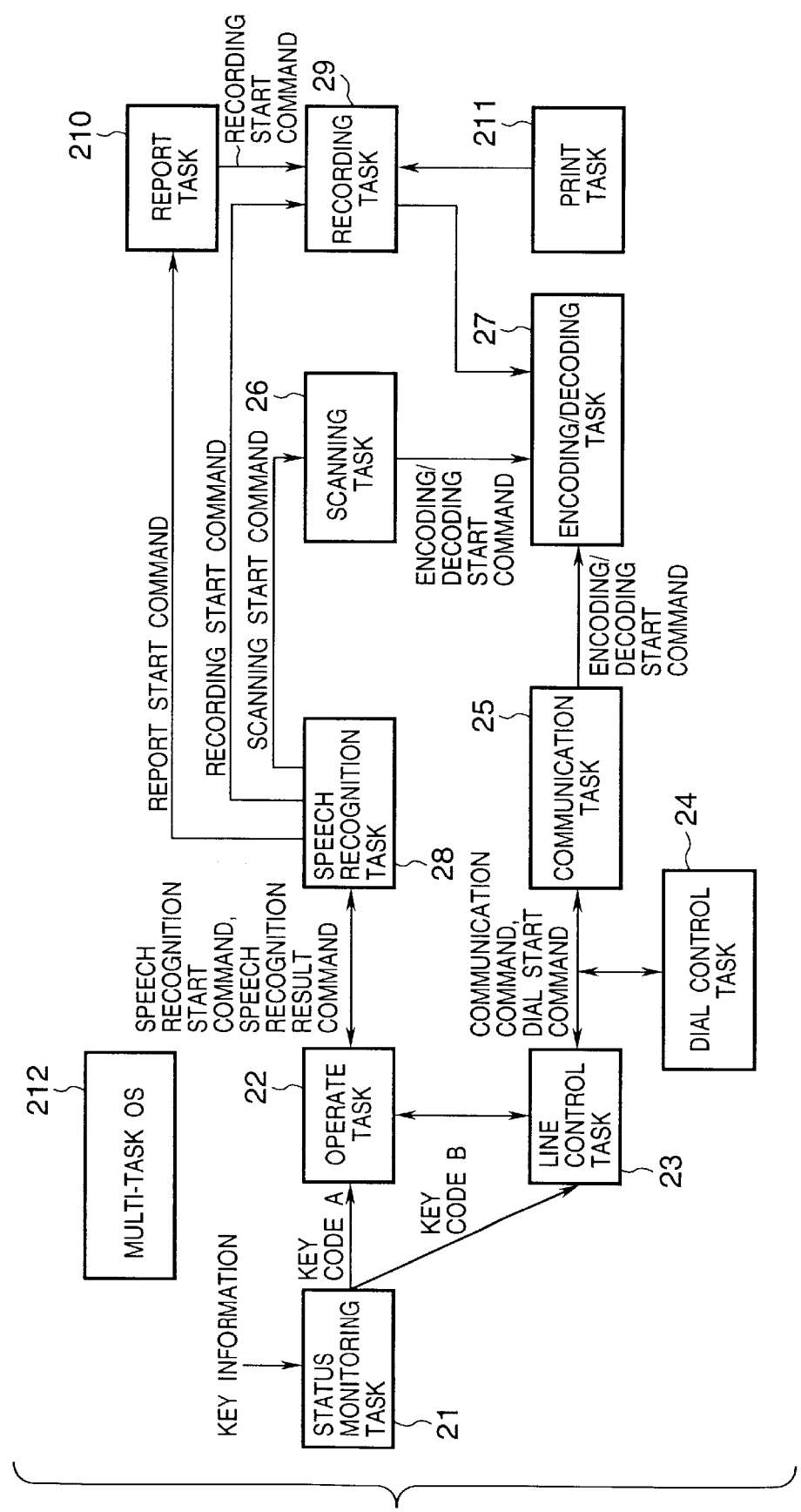
FIG. 2 is a task block diagram showing software for controlling the apparatus of the first embodiment.
Figure 3:
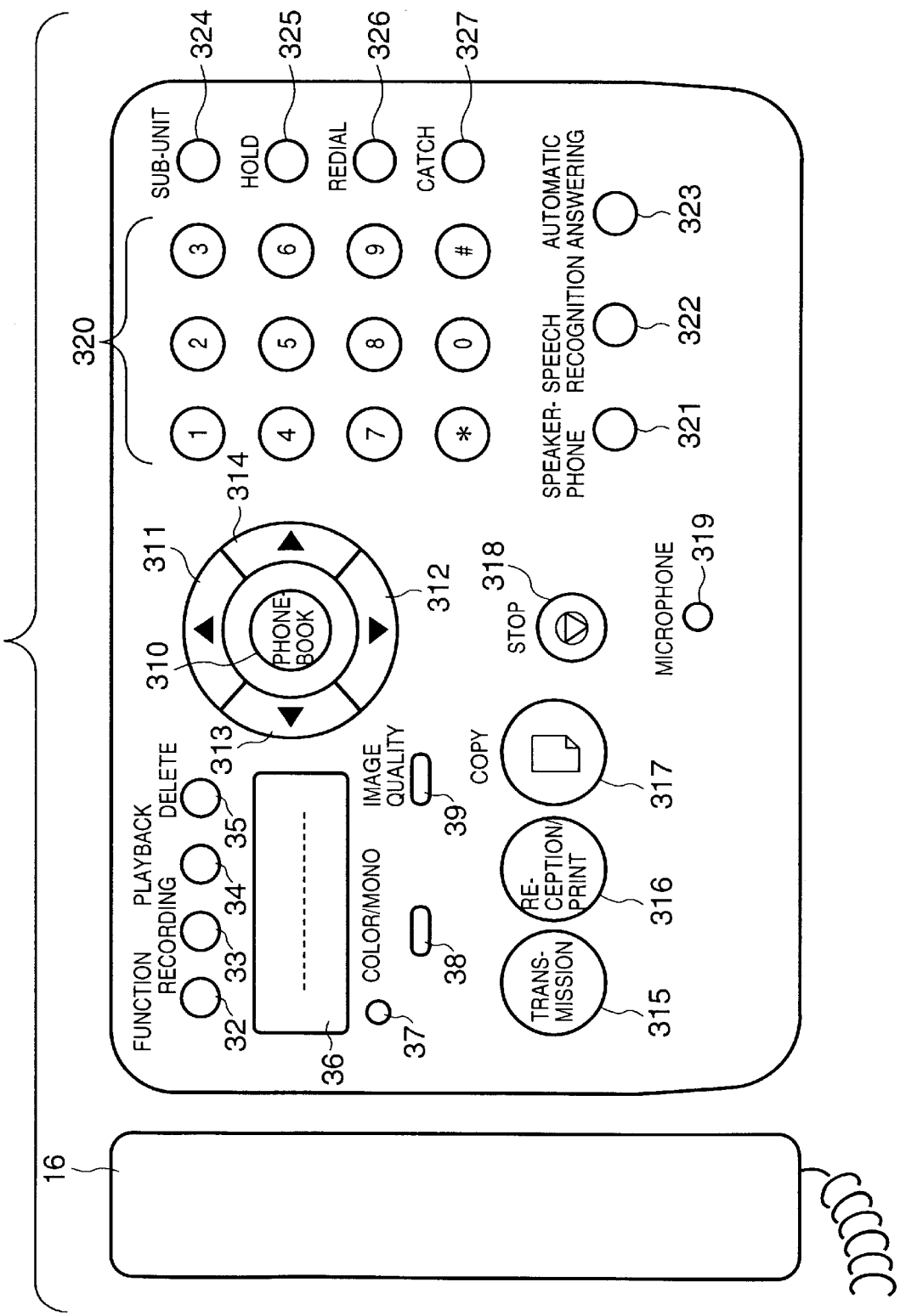
FIG. 3 is a view for explaining the arrangement of a control panel of the apparatus of the first embodiment.

FIG. 1 is a block diagram showing the system arrangement of this apparatus, FIG. 2 is a task block diagram showing software for controlling this apparatus, and FIG. 3 is a view for explaining the arrangement of a control panel of this apparatus. FIG. 4 is a view showing an image record as a management table assured on an SRAM 124 shown in FIG. 1 to manage image data by a controller of this apparatus.

[Arrangement]

Referring to FIG. 1, reference numeral 11 denotes a microprocessor (CPU) serving as a controller of this apparatus; 121, a ROM which stores programs and various data; and 118, a DRAM which is used as a work memory used upon executing various program, and a memory for storing audio data of, e.g., an automatic answering function, and monochrome and color image data. For example, the DRAM 118 has a memory size of 2 MB, 0.5 MB of which are used as the work memory, and the remaining 1.5 MB of which are used for storing image and audio data. Reference numeral 124 denotes an SRAM which registers registration data (various software switches, phonebook data, audio registration data for speech recognition, and apparatus ID data such as the telephone number, abbreviated name, and the like of the apparatus) required for the system. The SRAM 124 is backed up by a battery to prevent data from being lost when the power supply is turned off.

Reference numeral 12 denotes a known facsimile MODEM which has functions required for the ITU recommendation G3 mode, and comprises a Dual-Tone Multiple Frequency (DTMF) recognition function, an audio CODEC function for audio recording/playback using the DRAM, and the like in addition to V.29, V.21, and V.27 ter. Reference numeral 13 denotes a base unit which makes an analog low-power radio communication with a sub telephone unit 15, and is a known unit which controls radio communication in accordance with an instruction from the CPU 11.

Reference numeral 14 denotes an analog signal connection switch (cross point switch), which is a known circuit for freely changing connections of analog signals among a handset 16 of the apparatus main body, a microphone 17 used for inputting speech, a loudspeaker 18 for playing back speech, a network control unit (NCU) 19 for interfacing with a line, an audio input terminal of the CPU11, the MODEM 12, and the base unit 13 in accordance with the setups from the CPU 11.

Reference numeral 110 denotes a known runlength encoding/decoding circuit for generating a runlength code from monochrome binary image data, and for receiving a runlength code and outputting monochrome binary image data; and 111, a Real Time Clock (RTC) as a known timepiece IC. Reference numeral 125 denotes a hand scanner unit (HSU) which incorporates a color contact sensor (CS) 112 and a rotary encoder (RC) 116 for measuring the moving distance of the HSU 125 on an original, and is detachably connected to the apparatus main body via a curl cord. Reference numeral 113 denotes an encoder detector for generating moving distance data from rotational speed data of the rotary encoder 116 as one of output signals from the HSU 125, and sending it to the CPU 11.

Reference numeral 114 denotes an image processor for converting an analog RGB signal (line sequential signal: resolution=200 dpi) input from the color contact sensor 112 into 90-dpi R, G, and B 8-bit (24 bits per pixel) digital image data when color image data is stored in the DRAM 118 in accordance with an instruction from the CPU 11. The image processor 114 converts an analog RGB signal output from the color contact sensor 112 into 360-dpi Y, M, C, and K binary digital image data when a color copy is directly formed in accordance with an instruction from the CPU 11. These converted data are supplied to a Direct Memory Access (DMA) controller 117, which transfers 90-dpi R, G, and B color image data to the DRAM 118 when these data are to be stored in the DRAM 118, or transfers 360-dpi Y, M, C, and K binary data to a recording controller 119 when a color copy is to be directly formed.

When monochrome image data is to be stored in the DRAM 118, the image processor 114 converts an analog RGB signal output from the color contact sensor 112 into 200-dpi monochrome binary digital image data, and supplies it to the DMA controller 117. When a monochrome copy is to be directly formed, the image processor 114 converts an analog RGB signal output from the color contact sensor 112 into 360-dpi monochrome binary digital image data, and supplies it to the DMA controller 117. When monochrome image data is to be stored in the DRAM 118, the DMA controller 117 transfers monochrome image data to the DRAM 118; when a monochrome copy is to be directly formed, it transfers monochrome image data to the recording controller 119.

The recording controller 119 converts input image data into a data format that a recording unit 120 can record. The recording unit 120 comprises a known ink-ejection type color printer, and records an image by moving a cartridge which integrates an ink tank and ink ejection portion in the main scanning direction and moving a recording paper sheet in the sub-scanning direction. Whether a color or monochrome cartridge is currently attached can be determined by the CPU 11 depending on the electrical contact pattern between the recording unit 120 and a cartridge.

Reference numeral 115 denotes a known resolution conversion circuit for receiving monochrome image data and performing resolution conversion. The resolution conversion circuit 115 is used for enlarging/reducing a monochrome image, and is also used for matching the resolution of a monochrome image received from a line with the recording resolution of the recording unit 120.

Reference numeral 122 denotes a control panel serving as a console of this apparatus. As shown in FIG. 3, the control panel 122 has various keys, indication lamps, and an LCD display. Also, the microphone 17, loudspeaker 18, and the like are equipped on the control panel 122.

Reference numeral 126 denotes a sensor for detecting attachment/detachment of the hand scanner unit 125 to/from the apparatus main body. The CPU 11 determines a sheet mode for scanning a sheet original, or a hand scan mode for scanning a three-dimensional object such as a book original or the like on the basis of the output from the sensor 126.

The arrangement of the control panel 122 shown in FIG. 3 will be described below.

Referring to FIG. 3, reference numeral 16 denotes a handset for the main body; 32, a "function" key for various registration and setup processes; 33, a "recording" key used upon recording a voice message or conversation contents in the DRAM 118 as audio data; 34, a "playback" key used when the CPU 11 plays back audio data recorded in the DRAM 118 by the audio CODEC of the MODEM 12; 35, a "delete" key used upon deleting various data stored in the memory; and 36, an LCD display with a backlight, which can display 16 characters in two lines, and is used for outputting the states of the apparatus and various messages. Reference numeral 37 denotes a color mode indicator which is turned on when a color mode is selected by a "color/monochrome" key 38. Reference numeral 39 denotes an "image quality" key for selecting image quality in a monochrome mode.

Reference numeral 310 denotes a key which serves as both a "phonebook" key for displaying a phonebook, and a "set" key for settling registration contents (this key will be referred to as a "set" key hereinafter for the sake of simplicity). Reference numeral 311 denotes an "up cursor" key; 312, a "down cursor" key; 313, a "left cursor" key; and 314, a "right cursor" key. These keys are used in operation for display control.

Reference numeral 315 denotes a "transmission" key for facsimile transmission; and 316, a "reception/print" key upon facsimile reception and upon printing a received image. Reference numeral 317 denotes a "copy" key for starting copying; and 318, a "stop" key for interrupting apparatus operation which is underway. Reference numeral 319 denotes an opening for the microphone 17; 320, a ten-key pad; 321, a "speakerphone" key for setting the apparatus in a state wherein the microphone 17 is activated to output an audio signal onto a line while maintaining line connection, and an audio signal on the line is played back via the loudspeaker 18; 322, a "speech recognition" key for implementing automatic destination dialing by speech recognition; 323, an "automatic answering" key for automatically recording the conversation contents of a calling party in the DRAM 118 upon receiving an incoming call; 324, a "sub unit" key for calling a cordless sub-telephone unit from the apparatus main body to implement an intercommunication; 325, a "hold" key for outputting a melody to the partner while holding the line busy; 326, a "redial" key for automatically dialing the telephone number of the previous partner; and 327, a "catch" key used for making a so-called catch phone communication, i.e., for answering another call during a given telephone conversation, and then returning to the latter conversation afterwards.

[Operation]

While the hand scanner unit (HSU) 125 is attached to the apparatus main body, copying is done in a direct mode, and printing is executed by the recording unit 120 in cooperation with scanning of a sheet original without storing scanned data in the DRAM 118. Since data need not be stored in the DRAM 118, and memory overflow does not take place even at high resolution, the resolution is matched with that of the recording unit 120, and data is scanned at a resolution of 360 dpi in the sub-scanning direction. A maximum copy size corresponds to B4 width in the monochrome mode, and to A4 width in the color mode depending on the specifications of the recording unit 120.

While the hand scanner unit (HSU) 125 is detached from the apparatus main body and is used as a hand scanner, copying is done in a memory mode, and scanned data is stored in the DRAM 118 in units of pages. The scanned data is stored in the DRAM 118 since the print speed of the recording unit 120 is lower than the execution speed of a hand scan by the user without experiencing any stress. That is, by temporarily storing scanned data in the DRAM 118, hand scan can be completed within a short period of time. When the scanning resolution is set at, 360 dpi in correspondence with that of the recording unit 120, the data size per page becomes too large and occupies a memory size assigned to the DRAM 118, thus disturbing apparatus operations. Or the memory size of the DRAM 118 must be increased, resulting in high cost. For this reason, in this embodiment, the scanning resolution is limited to 200 dpi in the ,monochrome mode, and 90 dpi in the color mode, but the present invention is not limited to these values. The maximum copy size in the monochrome mode is B4 width for the same.reason as described above, but the maximum copy size in the color is limited to A6 (or postcard size) or smaller.

In this connection, the data size per B4-size page at 200 dpi in the monochrome mode is around 700 KB, the data size per A6-size page at 90 dpi in the color mode is around 600 KB; these data can be stored in the DRAM 118. Furthermore, when image data is stored in the DRAM 118 after it is encoded and compressed, the size and/or resolution can be increased. However, as will be described later, when encoding and compression are implemented by software, their processes are time-consuming, and the execution speed of hand scan is slow. In such case, hardware for implementing high-speed encoding and compression is added although the apparatus cost increases.

While the hand scanner unit (HSU) 125 is attached to the apparatus main body, facsimile transmission is done in a direct mode, scanned data is transferred to the MODEM 12 via the DRAM 118 without being stored, and image data is transmitted to a remote facsimile apparatus while scanning a sheet original.

While the hand scanner unit (HSU) 125 is detached from the apparatus main body and is used as a hand scanner, facsimile transmission is done in a memory mode, and scanned data is stored in the DRAM 118 in units of pages. This is for the same reason as in the memory mode upon copying.

[Software Arrangement]

The software arrangement of this embodiment will be explained below with reference to the task block diagram of this apparatus shown in FIG. 2. Software of this apparatus is given an environment that can parallelly implement the individual tasks by a multi-task operating system (OS) 212. The respective tasks will be explained below.

Reference numeral 21 denotes a status monitoring task having a function of monitoring events that occur in the apparatus, and informing a relevant task of event information upon detecting an event that requires a change in apparatus status. For example, upon detecting key information input by the control panel. 122, the task 21 informs an operate task 22 and line control task 23 of required key information, thus activating functions of the apparatus.

Reference numeral 22 denotes an operate task, which determines an operation mode upon receiving key code A information from the status monitoring task 21, issues a start command to a given task that implements a function, and controls the display function of the control panel 122 on the basis of the key code A information.

Reference numeral 23 denotes a line control task which executes a sequence for controlling the NCU 19 to accept an incoming call from a line, seize a line to output a dial signal in response to a dial request command from the operate task 22, and terminate communication by disconnecting a line. Also, the line control task 23 detects depression of the "transmission" key 315 or "reception/print" key 316 from key code B information output from the status monitoring task 21 in the line connection state, automatically determines if the calling party is a telephone or facsimile by analyzing a signal on the line, and issues a communication start command for a facsimile communication to a communication task 25 if the calling party is a facsimile.

Reference numeral 24 denotes a dial control task having a function of outputting various dial signals to a switching fabric in response to a dial start command from the line control task 23 or communication task 25.

Reference numeral 25 denotes a communication task which implements a communication procedure in a facsimile communication or image data transmission in response to a communication start command output from the line control task 23.

Reference numeral 26 denotes a scanning task which controls the hand scanner unit (HSU) 125 and image processor 114 to scan an original image in response to a scanning start command from the operate task 22.

Reference numeral 27 denotes an encoding/decoding task which encodes/decodes image data by software in response to an encoding/decoding start command from the communication task 25, the scanning task 26, and a recording task 29. In this embodiment, although software encoding/decoding requires a longer processing time than hardware encoding/decoding, the hardware cost can be greatly reduced. Note that known Modified Huffman (MH) coding is applied to a monochrome image, and a known coding scheme that assigns Huffman codes to RGB multivalued Differential Pulse Code Modulation (DPCM) (a scheme for calculating the difference between neighboring pixels using 8-bit R, G, and B values) is applied to a color image.

Reference numeral 28 denotes a speech recognition task, which is known speed recognition software for analyzing user speech input from the handset 16, comparing it with one or a plurality of speech data registered in advance, and giving information of matched speech data.

Reference numeral 29 denotes a recording task having a function of making the recording unit 120 print requested image data in response to a recording start command from a report task 210 or print task 211.

Reference numeral 210 denotes a report task which is software for generating various kinds of reports. For example, the report task 210 generates a communication management report that records a communication history, and a function setup list of registration information and the like in the SRAM 124 using character data, maps them into image data, and issues a recording request to the recording task 29.

Reference numeral 211 denotes a print task having a monitoring function of always checking if image data to be automatically recorded is stored in the DRAM 118, and issuing a recording start command to the recording task 29 upon detecting image data to be recorded.

[Image Record]

The structure of an image record shown in FIG. 4 will be explained below.

When the apparatus is started up for the first time, the image record as a management table for managing image data stored in the DRAM 118 is formatted on the SRAM 124 by the OS 212 and all records are empty at that time. The individual tasks acquire empty records from the OS 212 as needed, and generate record filled with required items while exchanging data among tasks. The individual tasks operate with reference to the contents of the generated image records as needed.

Each image record is comprised of a color/monochrome identification bit indicating the type of one document (may include one page or a plurality of pages) of the corresponding image on the DRAM 118, reception date information in case of a received image, a print request flag indicating if automatic print by the print task 211 must be activated, a transmission request flag indicating if transmission by the communication task 25 is required, the start address of a page chain table for displaying each page information contained in one document, and the like.

Each page chain table for displaying each page information consists of the start address of a page chain table for displaying the next page information, size information such as the main scanning width, sub-scanning width, and the like of the corresponding page, resolution information such as the main scanning and sub-scanning resolutions and the like of the corresponding page, and the start address of an image block chain table that stores the start address of image data of the corresponding page on the DRAM 118. The DRAM 118 is segmented into blocks each having a predetermined size, and the start address of the image block chain table indicates the address of each block.

Upon receiving an image, the communication task 25 completes the contents of an image record, and upon executing memory copying and transmitting an image by a hand scan, the scanning task 26 completes the contents of an image record. Image data which has become unnecessary after recording or transmission is deleted from the DRAM 118 when the corresponding image record is cleared, and management of that image record is returned from the task to the OS 212.

[Image Reception]

A series of operations for receiving an image and printing it out by the recording unit 120 will be explained below.

While no recording paper sheets are set in the apparatus main body, both color and monochrome images are memory-received, encoded image data is stored in the DRAM 118, and management information of an image record is stored in the SRAM 124.

Upon receiving a monochrome image, image information of Huffman codes is stored in the DRAM 118. Independently of image storage in the DRAM 118, one image record is recorded in the SRAM 124 as image management information. As described above, this image record contains a color/monochrome identification bit for identifying a color or monochrome image; bit "0" indicates a monochrome image and bit "1" a color image. The image record also has a field for recording image information and additional information. For example, reception date information, the image type indicating transmission or reception, and the like are recorded. If the number of receptions is two, the number of image records is also two, and the number of records increases as the number of memory receptions increases. When the user deletes a transmission/reception image, the image record in the SRAM 124 is deleted together with the encoded image information in the DRAM 118.

The apparatus in the standby state displays the number of received images on the control panel 122 on the basis of the image records.

Figure 5B:
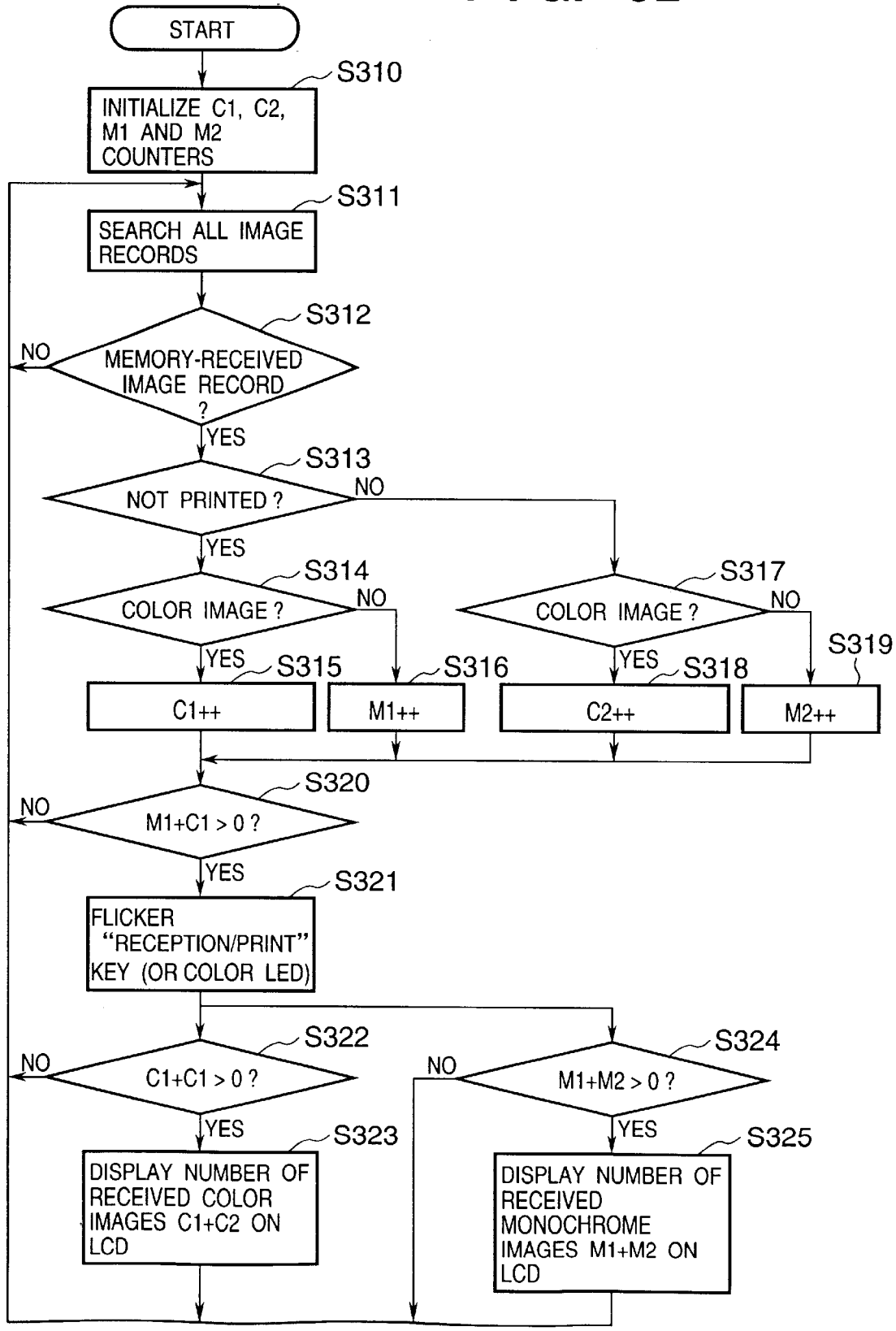
FIG. 5B is a flow chart showing the algorithm of displaying the number of images received by a facsimile apparatus.

FIGS. 5A and 5B show the algorithm for displaying the number of images received by the facsimile apparatus, and this algorithm is implemented by the CPU 11.

In step S310, counters C1, C2, M1, and M2 (to be described later) are initialized. In order to search for an image record of a non-printed received image in the standby state, all image records are checked in turn in loop_2 (S311). As a result of this search, if an image type identification bit which indicates a memory-received image is "1" (S312) and a print request flag indicating a non-printed image is "1" (S313) in a given image record, and if the color/monochrome identification bit of that image record is "1" to indicate a color image (S314), the counter C1 which indicates the number of non-printed received color images is incremented (S315). On the other hand, if the color/monochrome identification bit is "0" to indicate a monochrome image (S314), the counter M1 indicating the number of non-printed received monochrome images is incremented (S316).

On the other hand, if it is determined in step S313 that the print request flag of that image record is "0" to indicate that the corresponding image has already been printed out, and if the color/monochrome identification bit of that image record is "1" to indicate a color image (S317), the counter C2 that indicates the number of printed received color images is incremented (S318). On the other hand, if the color/monochrome identification bit is "0" to indicate a monochrome image (S317), the counter M2 indicating the number of printed received monochrome images is incremented (S319)

In this manner, count processes of these four counters C1 (indicating the number of non-printed received color images), M1 (indicating the number of non-printed received monochrome images), C2 (indicating the number of printed received color images), and M2 (indicating the number of printed received monochrome images) are done in all the image records.

If M1+C1≠0 (S320), since a non-printed received image is stored in the DRAM 118, the "reception/print" key 316 or an LED indicator placed in the neighborhood of that key is made to flicker (S321). Furthermore, if the counter C1 indicating the number of non-printed received color images is not zero, the color mode indicator 37 placed in the vicinity of the "color/monochrome" key 38 may be made to flicker. In this manner, the user can easily recognize if a monochrome or color image is received, by checking flickering of the "reception/print" key 316 or the LED indicator placed in the neighborhood of that key, and the color mode indicator 37 without gazing the LCD display 36.

If it is determined in step S322 that C1+C2>0, C1+C2 as the total of the number of non-printed received color images and the number of printed received color images is displayed on the LCD display 36 on the control panel 122 as the number of received color images stored in the DRAM 118, as shown in FIG. 6 (S323).

On the other hand, if it is determined in step S324 that M1+M2>0, M1+M2 as the total of the number of non-printed received monochrome images and the number of printed received monochrome images is displayed on the LCD display 36 on the control panel 122 as the number of received monochrome images stored in the DRAM 118, as shown in FIG. 7 (S325).

Figure 8:
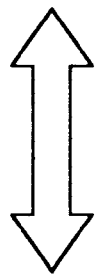
FIG. 8 shows alternate display states of the number of received monochrome images and the number of received color images.

Hence, when both the received monochrome and color images are stored in the DRAM 118, the number of received monochrome images and the number of received color images are alternately displayed, as shown in FIG. 8.

Print operation of received images will be explained below. Note that print operation upon receiving a monochrome image by the facsimile apparatus is known to those who are skilled in the art, and a detailed description thereof will be omitted. Print operation when both color and monochrome images are received and both the types of received images are stored in the DRAM 118 will be explained below.

In this case, the number of received monochrome images and the number of received color images are alternately displayed on the LCD display 36 in the standby state of the apparatus, ads shown in FIG. 8. In the following description, print operation will be exemplified below taking as an example a case wherein two received color images and two received monochrome images are stored, as shown in FIG. 8.

FIG. 9 shows the storage state of received images in the DRAM 118.

Figure 10:
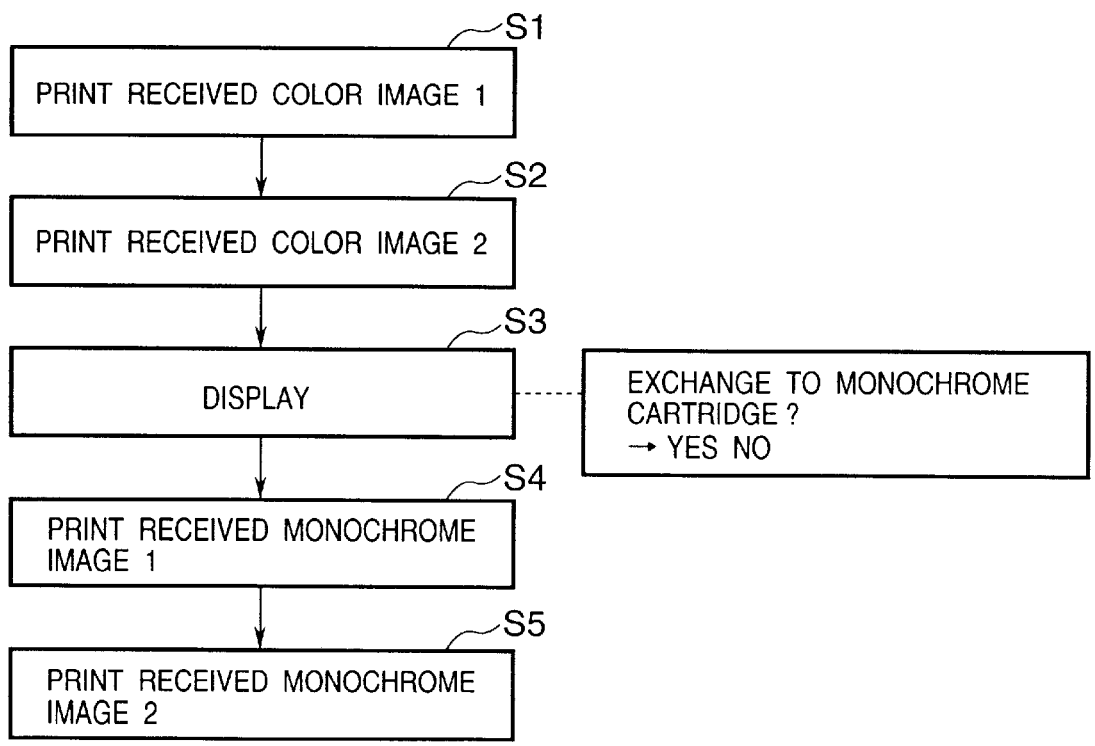
FIG. 10 shows an example of print order.

In the standby state of the apparatus, the user who wants to print in the reception state shown in FIGS. 8 and 9 presses the "reception/print" key 316 on the control panel 122 shown in FIG. 3. When the color cartridge is attached to the apparatus, the received images stored in the DRAM 118 are printed in an order shown in FIG. 10, i.e., in the order of received color image 1 (S1), received color image 2 (S2), received monochrome image 1 (S4), and finally, received monochrome image 2 (S5). In this case, after received color images 1 and 2 are printed, a message "EXCHANGE TO MONOCHROME CARTRIDGE" is displayed (S3) to ask the user if exchange of the cartridge is required. Although a monochrome image can be printed using the color cartridge, it is economical to use the monochrome cartridge upon printing a monochrome image. On the other hand, if the cartridge is exchanged, since cartridge cleaning is done, both the time required for exchange and the time required for cleaning are required. Hence, when the user wants to quickly print without exchange the cartridge, a monochrome print can be obtained without exchanging the cartridge.

If no user input is detected a predetermined period of time after the message "EXCHANGE TO MONOCHROME CARTRIDGE" was displayed, monochrome image printing may be continued.

A case will be explained below wherein the monochrome cartridge is attached when the user has pressed the "reception/print" key 316 on the control panel 122 shown in FIG. 3 to start printing in the standby state of the apparatus and in the reception state shown in FIGS. 8 and 9.

Figure 11:
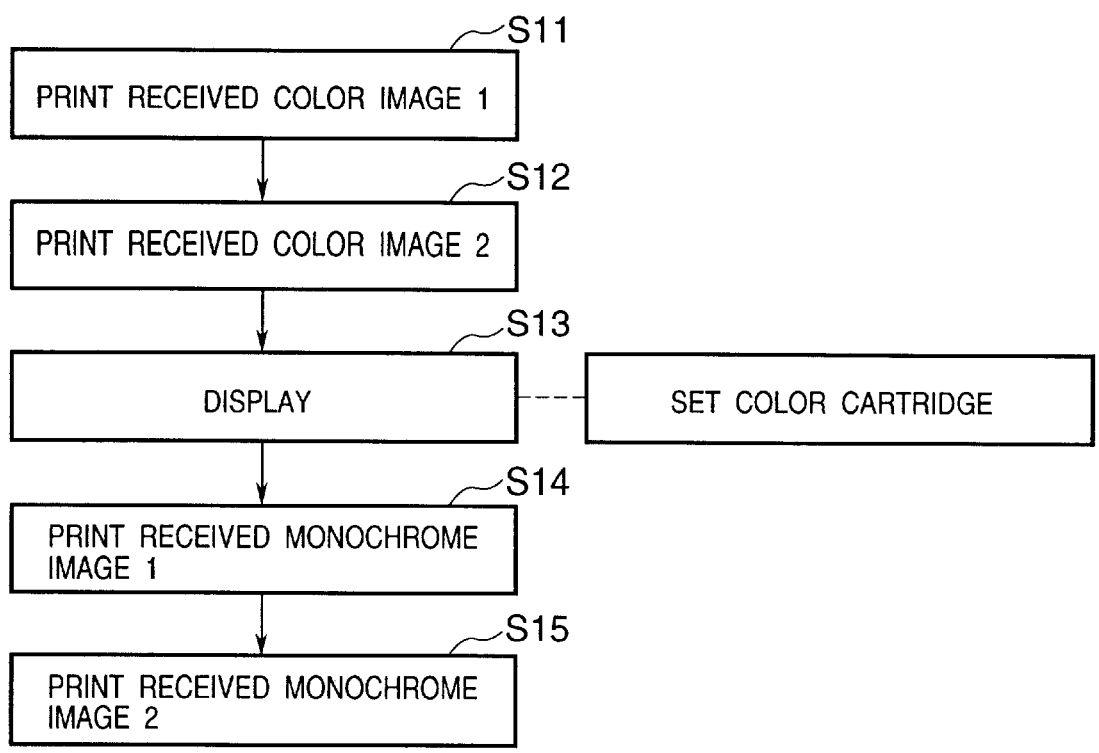
FIG. 11 shows another example of print order.

When the monochrome cartridge is attached to the apparatus, since a received color image cannot be printed, received monochrome images are preferentially printed. That is, after received monochrome image 1 (S11) and received monochrome image 2 (S12) are printed in an order shown in FIG. 11, a message "SET COLOR CARTRIDGE" is displayed (S13), and received color image 1 (S14) and received color image 2 (S15) are printed after the cartridge is exchanged.

If no user input is detected a predetermined period of time after the message "SET COLOR CARTRIDGE" was displayed, the received color image may be printed as a monochrome image.

As described above, according to this embodiment, when both received color and monochrome images are stored in the DRAM 118, received images can be efficiently printed in accordance with the type of cartridge attached to the apparatus at the time of printing, and the order of received images stored in the DRAM 118. In addition, upon printing the received color and monochrome images, the user can choose between low ink cost or easy printing (or short print time).

Not only the above messages are displayed on the LCD display 36 but also audio data stored in the ROM 121 and corresponding to the messages may be played back.

To restate, according to this embodiment, since printing of images is controlled on the basis of at least identification information indicating a memory-received image, identification information indicating a non-recorded image, and identification information indicating a color or monochrome image, the states of memory-received images can be easily recognized, and operability can be greatly improved.

Second Embodiment

An image communication apparatus according to the second embodiment of the present invention will be explained below. Note that the same reference numerals in this embodiment denote the same parts as those in the first embodiment, and a detailed description thereof will be omitted.

[Outline]

In case of a facsimile apparatus, an image is normally automatically received and recorded, and an image which is normally received and recorded is deleted from a memory. For this reason, when an image to be recorded is a color image but the ink cartridge attached is a monochrome cartridge, the color image cannot be appropriately printed, and the influence due to inappropriate recording is serious. As described in the first embodiment, the user may determine if an ink cartridge is to be exchanged, in accordance with the type of ink cartridge attached and the received image. However, the method of the first embodiment requires tedious operations, and may lead to user operation errors. In addition, since the intervention of the user is always required, the method of the first embodiment makes full automatic operation of the facsimile apparatus impossible.

On the other hand, when a monochrome ink cartridge is attached, reception of a color image may be rejected. However, the operability of the color facsimile apparatus worsens, and serious influences are expected especially in case of a full automatic color facsimile apparatus.

[Arrangement]

Figure 12:
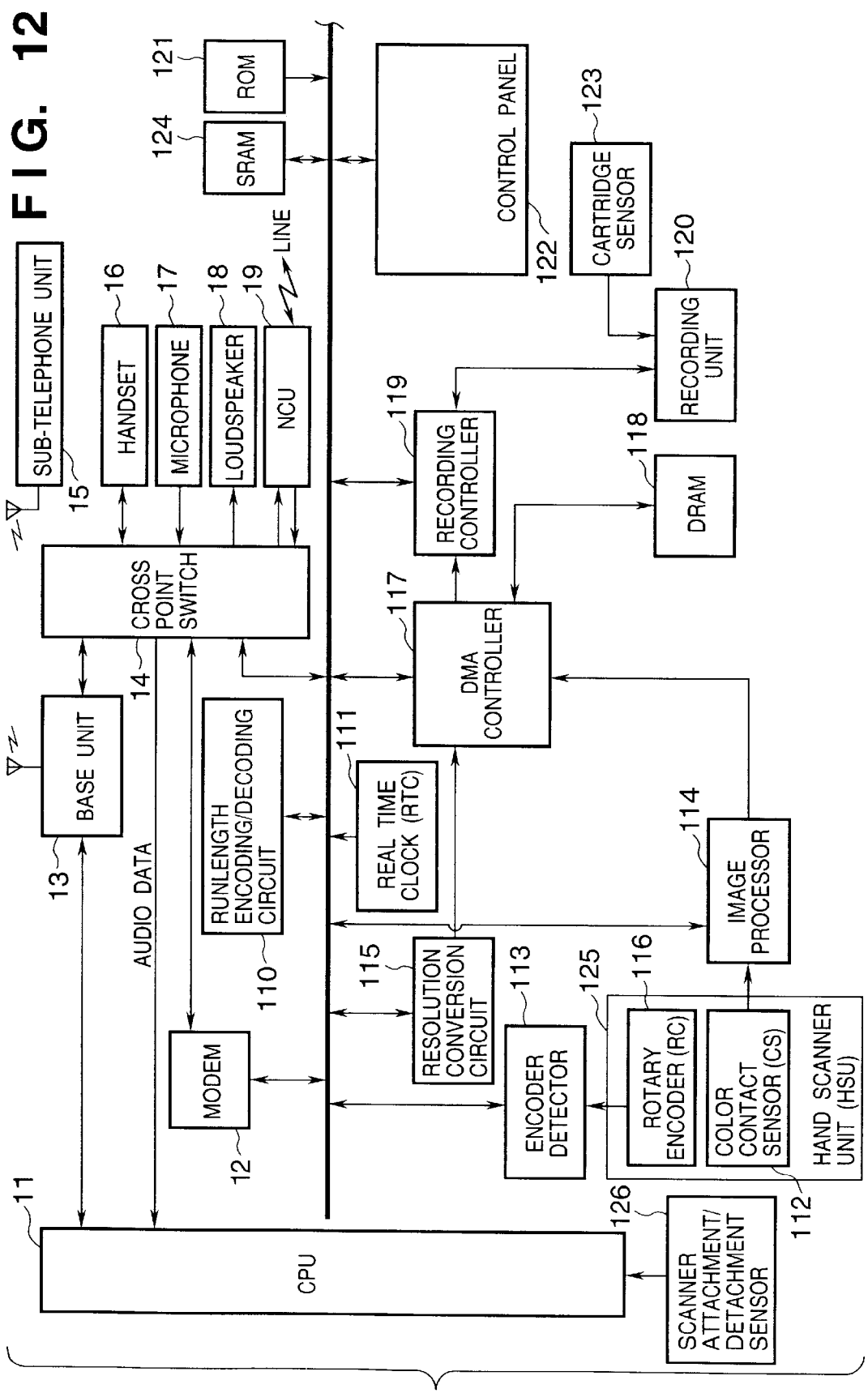
FIG. 12 is a block diagram showing the system arrangement of a facsimile apparatus according to the second embodiment of the present invention.

FIG. 12 is a block diagram showing the system arrangement of the second embodiment. Reference numeral 123 denotes a cartridge sensor, which is used by the CPU 11 upon checking if an ink cartridge is attached, and if the type of ink cartridge attached is that for color or monochrome image recording. Whether a color or monochrome cartridge is currently attached may be determined by the CPU 11 depending on the electrical contact pattern between the recording unit 120 and a cartridge.

[Color Copy Operation]

flow of color copy operation using the hand scanner unit (HSU) 125 will be briefly explained below.

When the hand scanner unit (HSU) 125 is detached from the apparatus main body, the operate task 22 recognizes the hand scanner mode on the basis of the output from the scanner attachment/detachment sensor 126. As a result, the LCD display 36 or the like on the control panel 122 displays a message indicating. that it is ready to execute a hand scan, thus prompting the user to select if an image is copied or transmitted.

When the "copy" key 317 has been pressed, and the color mode indicator 37 is ON upon designating the color mode using the "color/monochrome" key 38, the operate task 22 requests the scanning task 26 to execute a color scan using a scanning start command so as to copy a color image by a hand scan. The scanning task 26 receives information required for color copying from the operate task 22 to control hardware, and stores color image data for one page input in synchronism with the hand scan of the hand scanner unit (HSU) 125 in the DRAM 118.

Upon receiving a scanning end message from the scanning task 26, the operate task 22 issues a recording start command to the recording task 29 to record an image on the basis of the color image data stored in the DRAM 118. This recording start command is appended with image record information set by the scanning task 26. The recording task 29 reads out the color data stored in the DRAM 118 via the DMA controller 117 with reference to the image record information, converts the readout data into image data with a resolution of 360 dpi, transfers the converted data to the recording controller 119, thus making the recording unit 120 execute color image recording.

In this manner, upon completion of image recording for one page by the recording unit 120, the operate task 22 receives a processing end message, thus ending a series of copy operations. Then, display on the LCD display 36 on the control panel 122 is changed to that indicating the standby state.

[Monochrome Image Transmission]

operation flow upon transmitting a monochrome image will be briefly explained below.

When the hand scanner unit (HSU) 125 is detached from the apparatus main body, the operate task 22 determines the hand scan mode.

When the "transmission" key 315 on the control panel 122 has been pressed, and the color mode indicator 37 is OFF by setting the monochrome mode by the "color/monochrome" key 37, the operate task 22 requests the scanning task 26 to execute a monochrome scan using a scanning start command, so as to transmit a monochrome image by a hand scan. The scanning task 26 receives information required to transmit a monochrome image from the operate task 22 to control hardware, and stores monochrome image data for one page input in synchronism with hand scan of the hand scanner unit (HSU) 125 in the DRAM 118.

Upon receiving a scanning end message from the scanning task 26, the operate task 22 enters a destination input operation mode and asks the user to input the telephone number of an image destination. The operate task 22 issues a dial request command to the line control task 23 on the basis of the input telephone number to make it start line connection. Upon receiving the dial request command, the line control task 23 issues a dial start command to the dial control task 24.

When a line is connected upon completion of dialing by the dial control task 24, the line control task 23 issues a communication start command to the communication task 25 to make it transmit the monochrome image data stored in the DRAM 118. The communication start command is appended with image record information set by the scanning task 26. The communication task 25 reads out the monochrome image data stored in the DRAM 18 with reference to the image record information, controls the runlength encoding/decoding circuit 110 to encode the image data while maintaining a resolution of 200 dpi, and transfers the obtained code data to the MODEM 12, thus transmitting a monochrome image.

Upon completion of transmission, the operate task 22 receives a processing end message, thus ending a series of copy operations. Then, display on the LCD display 36 on the control panel 122 is changed to that indicating the standby state.

[Color Image Transmission]

The operation flow upon transmitting a color image will be briefly explained below.

When the hand scanner unit (HSU) 125 is detached from the apparatus main body, the operate task 22 determines the hand scan mode.

When the "transmission" key 315 on the control panel 122 has been pressed, and the color mode indicator 37 is ON by setting the color mode by the "color/monochrome" key 37, the operate task 22 requests the scanning task 26 to execute a color scan using a scanning start command, so as to transmit a color image by a hand scan The scanning task 26 receives information required to transmit a color image from the operate task 22 to control hardware, and stores color image data for one page input in synchronism with the hand scan of the hand scanner unit (HSU) 125 in the DRAM 118.

Upon receiving a scanning end message from the scanning task 26, the operate task 22 enters a destination input operation mode and asks the user to input the telephone number of an image destination. The operate task 22 issues a dial request command to the line control task 23 on the basis of the input telephone number to make it start line connection. Upon receiving the dial request command, the line control task 23 issues a dial start command to the dial control task 24.

When a line is connected upon completion of dialing by the dial control task 24, the line control task 23 issues a communication start command to the communication task 25 to make it transmit the color image data stored in the DRAM 118. The communication start command is appended with image record information set by the scanning task 26. The communication task 25 reads out the color image data stored in the DRAM 18 with reference to the image record information, controls the runlength encoding/decoding circuit 110 to encode the image data while maintaining a resolution of 90 dpi, and transfers the obtained code data to the MODEM 12, thus transmitting a color image.

Upon completion of transmission, the operate task 22 receives a processing end message, thus ending a series of copy operations. Then, display on the LCD display 36 on the control panel 122 is changed to that indicating the standby state.

[Transmission/reception of Image]

The operation of this apparatus upon transmitting/receiving a monochrome or color image will be explained below.

(1) Facsimile Transmission from Telephone Conversation State

When the "transmission" key 315 on the control panel 122 has been pressed during telephone conversation, the LCD display 36 displays a message "SET ORIGINAL", and prompts the user to set an original of an image to be transmitted facing down at an original entrance. When the original is normally set, an original scan is started, and negotiation for facsimile transmission is executed. After that, transmission is started. At this time, the LCD display 36 displays a message "FAX TRANSMISSION IN PROGRESS".

(2) Color Image Transmission

Before depression of the "transmission" key 315, the "color/monochrome" key 38 is pressed to set the color mode and to turn on the color mode indicator 37. An available transmission image size in this case is only a postcard size, and the magnification and the like cannot be set. At this time, the LCD display 36 displays a message "COLOR TRANSMISSION IN PROGRESS".

(3) Image Transmission Using Hand Scanner Unit

When the panel is opened from the standby state or the hand scanner unit (HSU) 125 is detached from the apparatus main body, the LCD display 36 on the control panel 122 displays "HAND SCANNER→FAX TRANSMISSION COPY". When the user presses the "transmission" key 315 in this state, the facsimile transmission mode is set, and the LCD display 36 displays "TRANSMISSION WIDTH [A4] >[MONOCHROME] [NORMAL]".

In this state, when the user sets the color mode by setting the "color/monochrome" key 38, the color mode indicator 37 is turned on, and the width of the image to be transmitted is inhibited from being changed. With this operation, the LCD display 36 displays "TRANSMISSION WIDTH [POSTCARD] [COLOR] [PHOTO]". By pressing the "set" key 310 in this state, the LCD display 36 displays "HAND SCANNER SCAN SET KEY =START/END".

When the user presses the "color/monochrome" key 38 in this state, the color mode is switched to the monochrome mode, and display on the LCD display 36 returns to the immediately preceding state. However, when the user presses the "set" key 310, an original image begins to be scanned using the hand scanner unit (HSU) 125, and a message "SCANNER SPEED >>>>SET KEY=END" is displayed. Note that the number of ">"s displayed increases as the hand scanner unit (HSU) 125 is moved faster. If the moving speed of the hand scanner unit (HSU) 125 detected by the encoder detector 113 is too high, a message "SCANNER TOO FAST SET KEY =END" is displayed.

When the original scan by the hand scanner unit (HSU) 125 is successfully completed, the LCD display 36 displays "CHECK PRINT→YES NO" to select whether or not the scanned image is to be printed to check it. If the user selects "YES", the image data scanned and stored in the DRAM 118 is output to the recording unit 120, and is printed. During this interval, "CHECK PRINT IN PROGRESS" is displayed. Upon completion of check print, "INPUT FAX NUMBER" is displayed, and the telephone number input using, e.g., the ten-key pad 320 or the like is displayed on the LCD 36.

On the other hand, if the user selects "NO", the telephone number input is prompted without printing by the recording unit 120. In this manner, the telephone number of an image destination is input, and when color image transmission is instructed upon depression of the "transmission" key 315, the LCD display 36 displays "COLOR TRANSMISSION IN PROGRESS". On the other hand, in case of monochrome image transmission, "FAX TRANSMISSION IN PROGRESS" is displayed.

(4) Operation Until Facsimile Reception is Started

By pressing the "reception" key 316 during telephone conversation, facsimile reception is started. While the line has been seized and no original is set, when the user detects the reception start timing by hearing a calling tone (CNG) sent from the partner (source) and presses the "reception" key 316, facsimile reception is started. When the "reception" key 316 has been pressed, if the handset 16 is off-hook, and a voice guidance is "ON", the user is given a voice message "FAX reception will start. Replace handset". At this time, the LCD display 36 displays "FAX RECEPTION WILL STARTS. REPLACE HANDSET".

During facsimile reception, messages "FAX RECEPTION IN PROGRESS" and "FAX RECEPTION IN PROGRESS P1" in case of a monochrome image, or messages "COLOR RECEPTION IN PROGRESS" and "COLOR RECEPTION IN PROGRESS P1" in case of a color image are alternately displayed on the LCD display 36.

Upon successful completion of facsimile reception, an end alarm is generated, and a message "RECEPTION END" is displayed on the LCD display 36.

[Monochrome Image Scanning]

Figure 13:
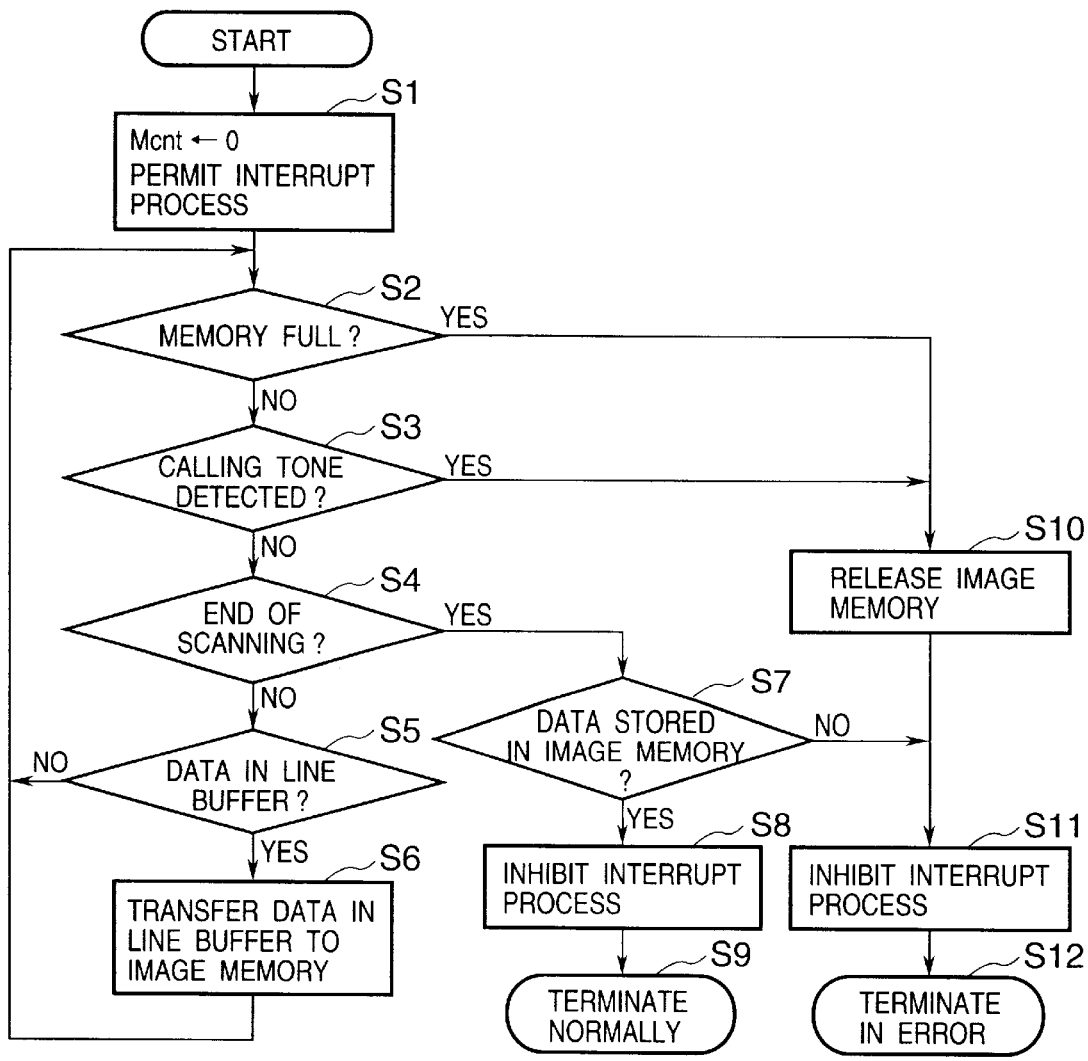
FIG. 13 is a flow chart showing control upon transmitting a monochrome image or upon scanning a monochrome image to obtain a copy using a hand scanner in the facsimile apparatus of the second embodiment.
Figure 14:
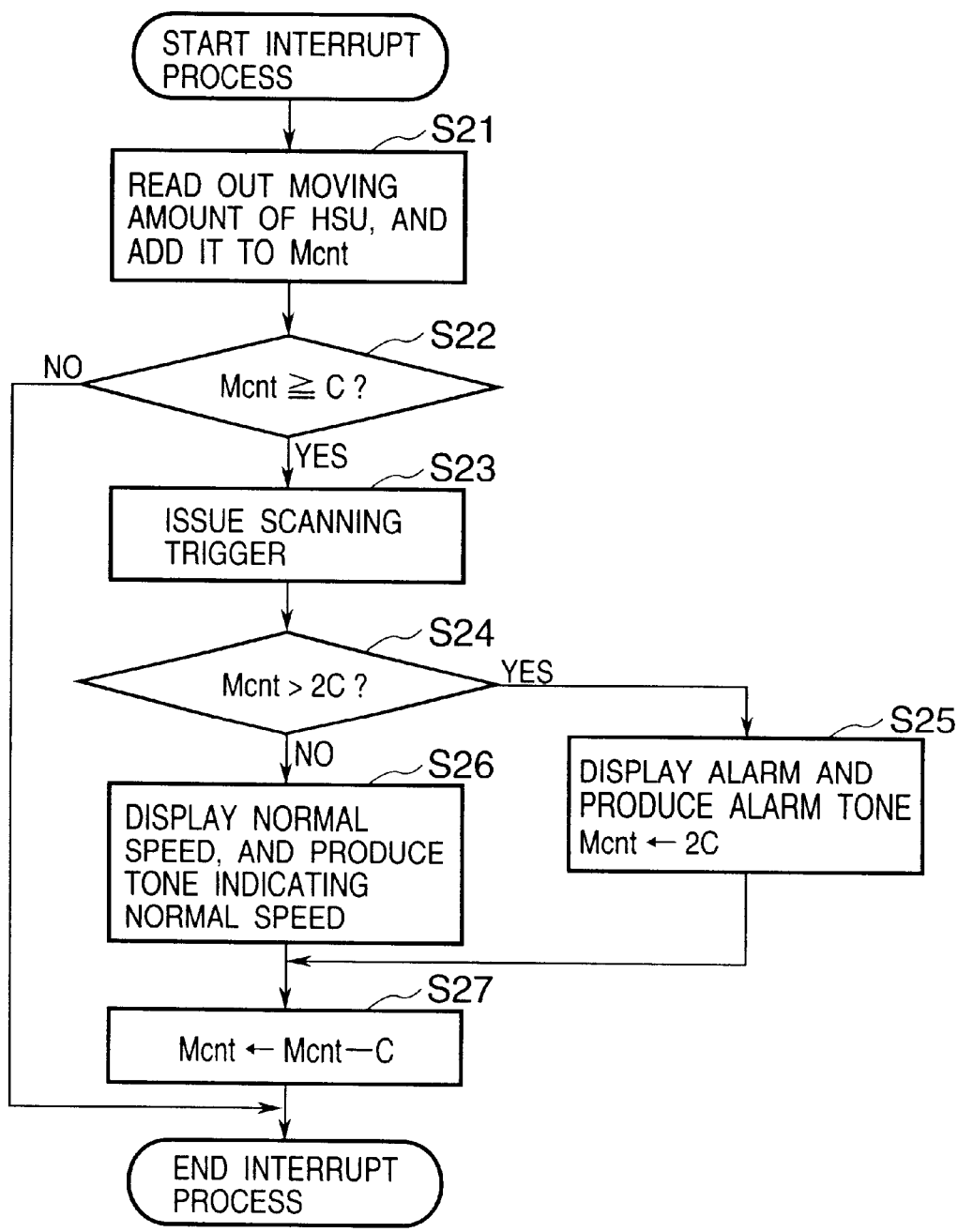
FIG. 14 is a flow chart showing an interrupt process executed parallel to the process shown in the flow chart in FIG. 13 in the facsimile apparatus of the second embodiment.

FIGS. 13 and 14 are flow charts showing the processing of the scanning task 26 upon scanning a monochrome image to transmit or copy a monochrome image using the hand scanner unit (HSU) 125 in the image communication apparatus of the second embodiment. A program corresponding to this processing is stored in the ROM 121, and is executed by the CPU 11.

Upon receiving a monochrome image scanning start command from the operate task 22, the scanning task 26 resets a moving amount counter Mcnt (assured on the SRAM 124) indicating the moving distance of the hand scanner unit (HSU) 125 to "0", and permits an interrupt generated approximately every 2.5 msec (step S1). In this manner, an interrupt process shown in FIG. 14 is started.

When the user places the hand scanner unit (HSU) 125 on an original and moves it in the scanning direction, the encoder 116 rotates. In this case, when the hand scanner unit (HSU) 125 has moved a distance corresponding to one line in a superfine mode, the output from the encoder 116 changes. The encoder detector 113 stores the number of times of change in output from the encoder 116.

FIG. 14 is a flow chart showing the interrupt process generated approximately every 2.5 msec. Upon generation of an interrupt at every 2.5 sec, the number of times of change in output of the encoder 116 that indicates the moving amount of the hand scanner unit (HSU) 125 is read out from the encoder detector 113 at a scanning trigger timing, and that moving amount is added to the moving amount counter Mcnt in step S21.

It is checked in step S22 if the value of the moving amount counter Mcnt is equal to or larger than a value C (when the scanning resolution in the sub-scanning direction is in a standard mode, "4"; when it is in a fine mode, "2") which is determined in advance in correspondence with the scanning resolution. If YES in step S22, the flow advances to step S23 to issue a scanning trigger to the image processor 114.

The flow then advances to step S24 to check if the value of the moving amount counter Mcnt exceeds 2C. If YES in step S24, since the moving speed of the hand scanner unit (HSU) 125 is too high, the LCD display 36 displays a message indicating this ("SCANNER TOO FAST", as described above), and an alarm sound is produced from the loudspeaker 321. At this time, the value of the moving amount counter Mcnt is set to be "2C".

Conversely, if the value of the moving amount counter Mcnt is equal to or smaller than "2C", the flow advances from step S24 to step S26, and since the moving speed of the hand scanner unit (HSU) 125 is appropriate, a message indicating this ("SCANNER SPEED >>>", as described above) is displayed, and a sound indicating a normal speed is produced from the loudspeaker 321. After step S25 or S26, the flow advances to step S27 to subtract the value C from the value of the moving amount counter Mcnt.

The image processor 114 performs A/D conversion and image processing of image information obtained from the color contact sensor (CS) 112. The monochrome image data that has undergone the image processing is written in a line buffer on the DRAM 118 via the DMA controller 117.

The scanning task 26 monitors in step S5 in FIG. 13 if image data has been written in the line buffer. If image data has been written, the flow advances to step S6 to transfer the image data written in the line buffer to an image memory which is also assured on the DRAM 118.

Upon completion of image scanning by the hand scanner unit (HSU) 125, when the user has pressed the "set" key 310 on the control panel 122, the operate task 22 sends a scanning end command to the scanning task 26 in step S4. In this manner, upon detection of end of scanning in step S4, the flow advances to step S7 to check if an image has been scanned by checking whether or not image data is present in the image memory on the DRAM 118. If YES in step S7, the flow advances to step S8 to inhibit the interrupt process, and the monochrome image scanning process terminates normally in step S9. If no image is scanned, the flow advances to step S11 to inhibit the interrupt process, and the monochrome image scanning process terminates in error in step S12.

On the other hand, during image scanning, if it is determined in step S2 that the image memory is full of data or if it is determined in step S3 that a calling tone detection circuit detects a calling tone (CNG), the flow advances to step S10 to release the image memory. The interrupt process is inhibited in step S11, and the monochrome image scanning process terminates in error in step S12. When the image memory is full of data, an image cannot be scanned. On the other hand, upon detecting a calling tone (CNG), reception is preferentially done.

After that, the scanning task 26 informs the operate task 22 if the scanning process has terminated normally or in error. If the scanning process terminates normally, the operate task 22 issues a recording start command to the recording task 29 if copy operation is instructed, and makes it record the scanned image. On the other hand, if the scanning process terminates in error, the operate task 22 ends copy operation.

Note that the scanning process in monochrome image transmission using the hand scanner unit (HSU) 125 is substantially the same as that in the monochrome copy mode, except that after an original image is scanned, if check print is instructed, the recording task 29 is started to execute recording; otherwise, the scanned image is transmitted without starting the recording task 29.

[Color Image Scanning]

Figure 15:
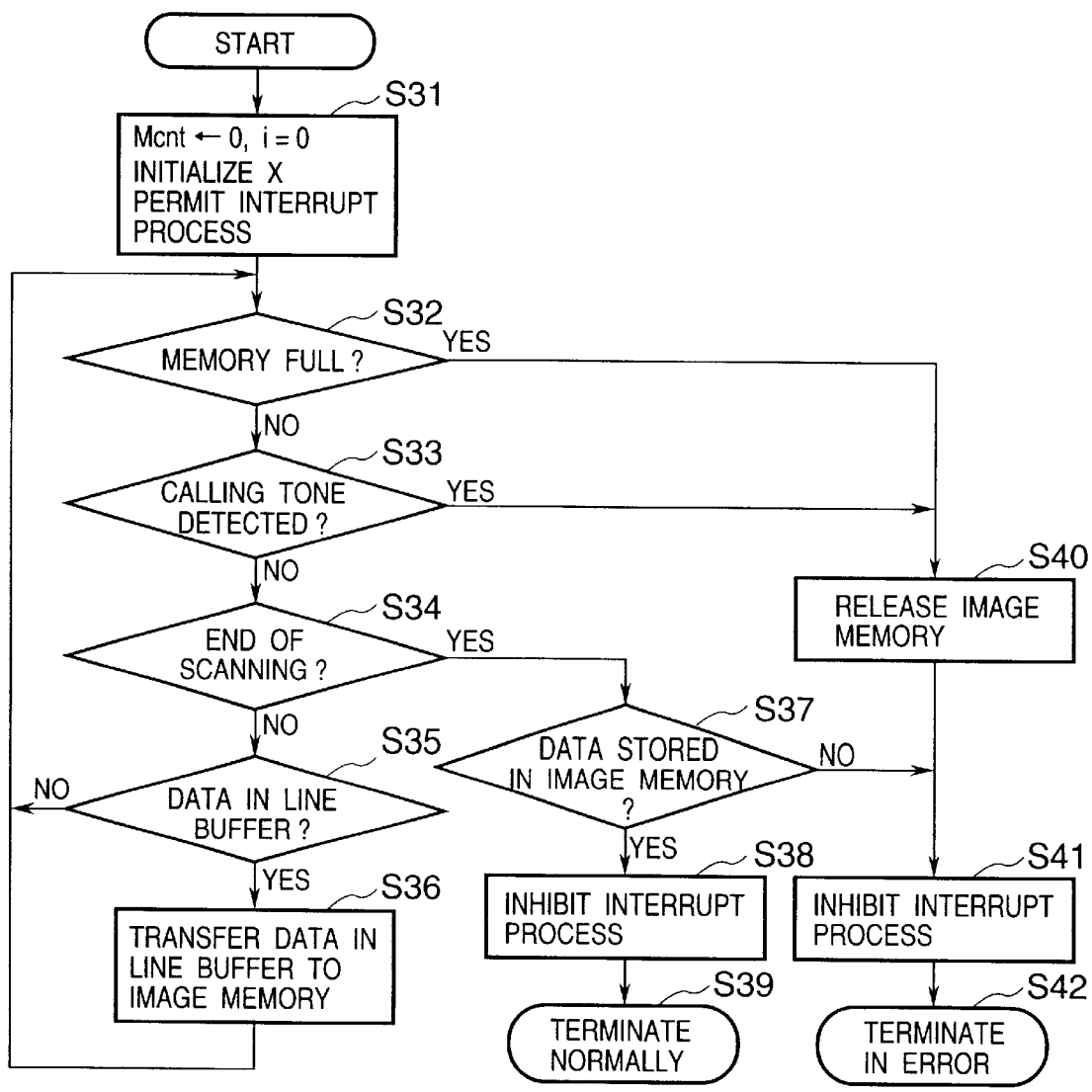
FIG. 15 is a flow chart showing control upon scanning a color original image to obtain a color image copy using the hand scanner in the facsimile apparatus of the second embodiment.
Figure 16:
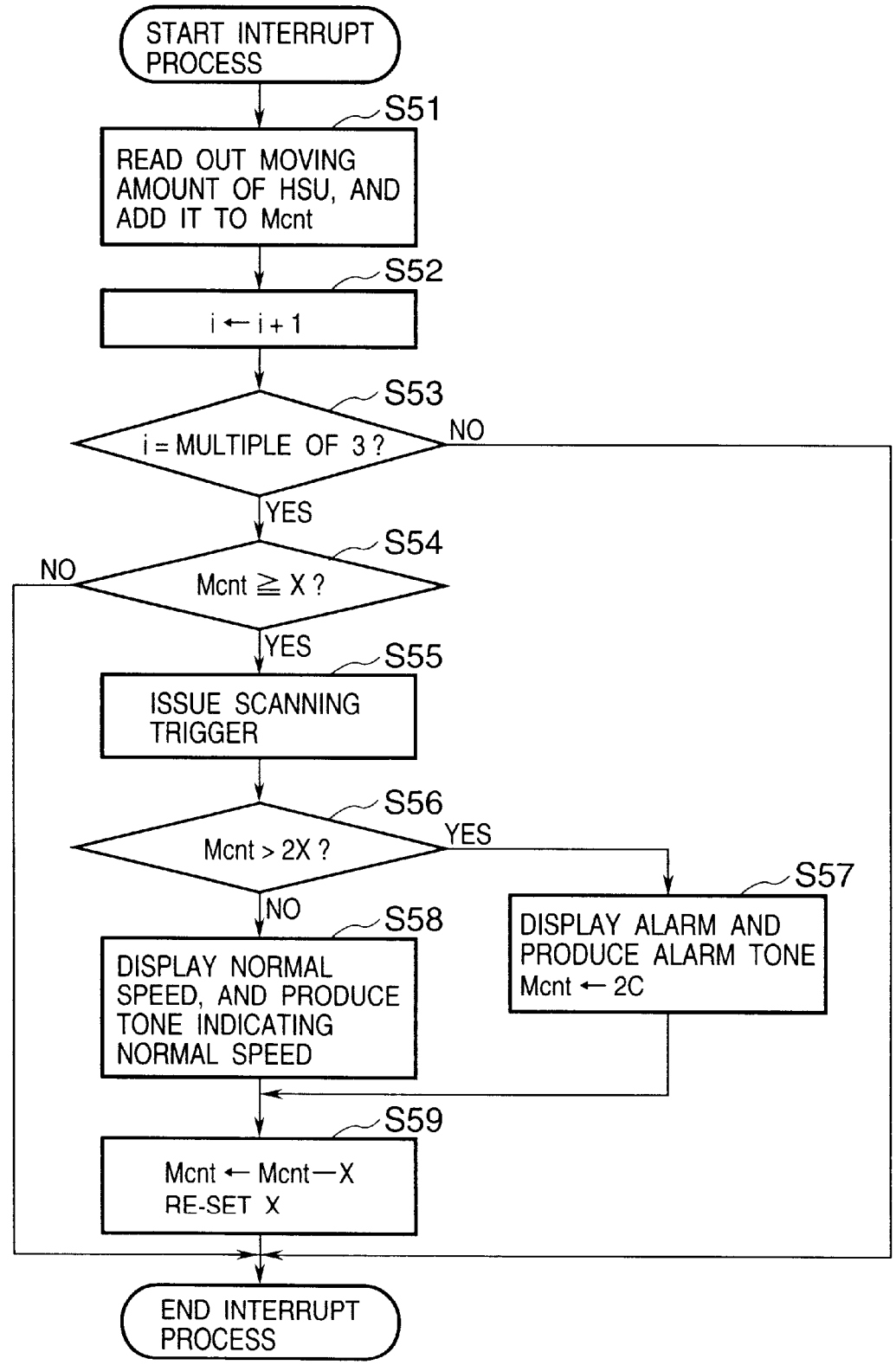
FIG. 16 is a flow chart showing an interrupt process executed parallel to the process shown in the flow chart in FIG. 15 in the facsimile apparatus of the second embodiment.

FIGS. 15 and 16 are flow charts showing the processing of the scanning task 26 upon scanning a color image to obtain a color copy using the hand scanner unit (HSU) 125 in the image communication apparatus of the second embodiment. A program corresponding to this processing is stored in the ROM 121, and is executed by the CPU 11.

Upon receiving a color image scanning start command from the operate task 22, in step S31 the scanning task resets the moving amount counter Mcnt to "0", resets a counter i (assured on the SRAM 124; to be described later) to "0", and initializes a scanning trigger issuance count value X (assured on the SRAM 124) for issuing a scanning trigger when the value of the moving amount counter Mcnt has exceeded a count value "X" at which the scanning trigger is to be issued, thus permitting an interrupt generated approximately every 2.5 msec. In this manner, an interrupt process shown in FIG. 16 is started. Since the scanning resolution in the color copy mode in the sub-scanning direction is 90 dpi, the scanning trigger issuance count value X does not assume a fixed value, and the value X must be re-set to be "4" or "5" every time one line is scanned.

As described above, when the user places the hand scanner unit (HSU) 125 on an original and moves it in the scanning direction, the encoder 116 rotates, and the number of times of change in output of the encoder 116 is stored in the encoder detector 113.

Upon generation of an interrupt approximately every 2.5 msec, the flow advances to step S51 shown in FIG. 16. In step S51, the number of times of change in output of the encoder 116 that indicates the moving amount of the hand scanner unit (HSU) 125 is read out from the encoder detector 113 at a scanning trigger timing, and that moving amount is added to the moving amount counter Mcnt.

The flow then advances to step S52 to increment the value of the aforementioned counter i. The flow advances to step S53 to check if the value of the counter i has become a multiple of "3", i.e., if scanning of R, G, and B colors is complete. If NO in step S53, the interrupt process ends. In each interrupt process, assume that image scanning (requires around 2.5 msec per color) by sensors corresponding to R, G, and B colors is executed in turn by hardware, and image data scanned by the sensors corresponding to the respective colors are held by hardware.

If it is determined in step S53 that the value of the counter i has become a multiple of "3", the flow advances to step S54 to check if the value of the moving amount counter Mcnt is equal to or larger than the scanning trigger issuance count value X. If YES in step S54, the flow advances to step S55, and a scanning trigger is issued to the image processor 114. In this manner, image data for three colors, i.e., R, G, and B colors are input.

The flow advances to step S56 to check if the value of the moving amount counter Mcnt has exceeded a value twice the scanning trigger issuance count value X (2×). If YES in step S56, the flow advances to step S57. In this case, since the moving speed of the hand scanner unit (HSU) 125 is too high, a message indicating this is displayed on the LCD display 36, an alarm sound is produced from the loudspeaker 321, and the value of the moving amount counter Mcnt is set to be 2×. Conversely, if the value of the moving amount counter Mcnt is equal to or smaller than 2×, the flow advances to step S58, and it is determined that the moving speed of the hand scanner unit (HSU) 125 is appropriate, thus displaying a message and producing a sound to that effect.

After the process in step S57 or S58, the flow advances to step S59. In step S59, the scanning trigger issuance count value X is subtracted from the value of the moving amount counter Mcnt, and the scanning trigger issuance count value X for the next line is re-set.

In this manner, color image data of an original image scanned by the color contact sensor (CS) 112 undergoes A/D conversion and image processing in the image processor 114. After the image processing, the color image data is written in the line buffer on the DRAM 118 in the order of R, G, and B via the DMA buffer 117.

Referring back to the flow chart in FIG. 15, the scanning task 26 monitors in step S35 if image data is written in the line buffer on the DRAM 118. If YES in step S35, the flow advances to step S36 to transfer the image data written in the line buffer to the image memory which is also assured on the DRAM 118.

Upon completion of image scanning by the hand scanner unit (HSU) 125, when the user presses the "set" key 310 on the control panel 122, the operate task 22 sends a scanning end command to the scanning task 26. Upon detecting end of scanning in step S34, the flow advances to step S37 to check if an image has been scanned by checking whether or not image data is present in the image memory on the DRAM 118. If YES in step S37, the flow advances to step S38 to inhibit the interrupt process, and the scanning process normally ends in step S39. If no image is scanned, the flow advances to step S41 to inhibit the interrupt process, and the scanning process terminates in error in step S42.

On the other hand, during image scanning, if it is determined in step S32 that the image memory is full of data or if it is determined in step S33 that a calling tone detection circuit detects a calling tone (CNG), the flow advances to step S40 to release the image memory. The interrupt process is inhibited in step S41, and the scanning process terminates in error in step S42.

After that, the scanning task 26 informs the operate task 22 if the scanning process has terminated normally or in error. If the scanning process terminates normally, the operate task 22 issues a recording start command to the recording task 29 if copy operation is instructed, and makes it record the scanned image. On the other hand, if the scanning process terminates in error, the operate task 22 ends copy operation.

Note that the scanning process upon transmitting a color image using the hand scanner unit (HSU) 125 is substantially the same as that in the color copy mode, except that after an original image is scanned, if check print is not instructed (check print "NO" is selected), the scanned image is transmitted without being printed by the recording unit 120.

[Color Image Encoding When Hand Scanner is Used]

Encoding upon transmitting a color image using the hand scanner unit (HSU) 125 will be explained below. FIG. 18 is a flow chart showing this encoding process, and a program corresponding to this process is stored in the ROM 121 and is executed by the CPU 11.

Figure 17A:
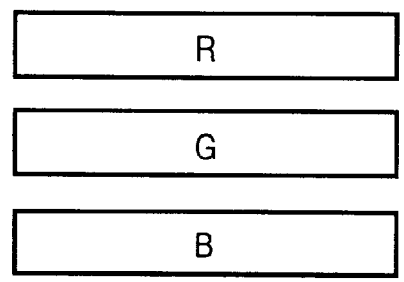
FIGS. 17A and 17B are views for explaining RGB data and its code data format.
Figure 17B:

Upon receiving an encoding start command from the communication task 25, the encoding/decoding task 27 reads out image data stored in the image memory in units of lines in the order of R, G, and B (see FIG. 17A), and encodes the readout data by a known encoding process based on Differential Pulse Code Modulation (DPCM) (steps S61, S62, and S63). After that, the encoding/decoding task 27 appends EOL (End of Line) of a Huffman code in step S64 (see FIG. 17B), and writes the encoded data in a communication buffer on the DRAM 118. If it is determined in step S65 that image data for the next line to be encoded exists, the task 27 repeats the aforementioned encoding process (S61 to S64).

[Color Image Encoding in Sheet Scan]

Figure 19:
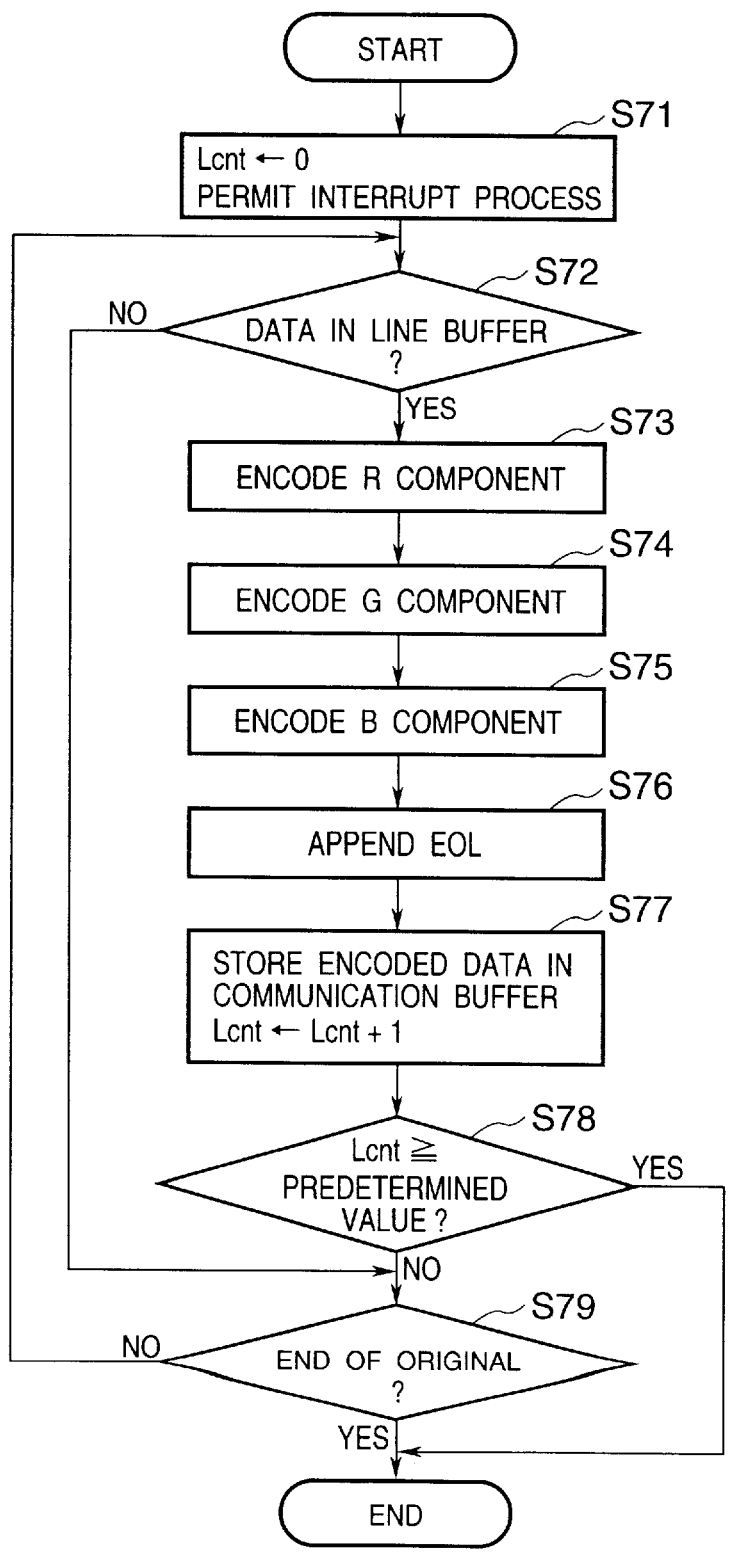
FIG. 19 is a flow chart showing processes from scanning of an original image by a sheet scan until transmission of the image.
Figure 20:
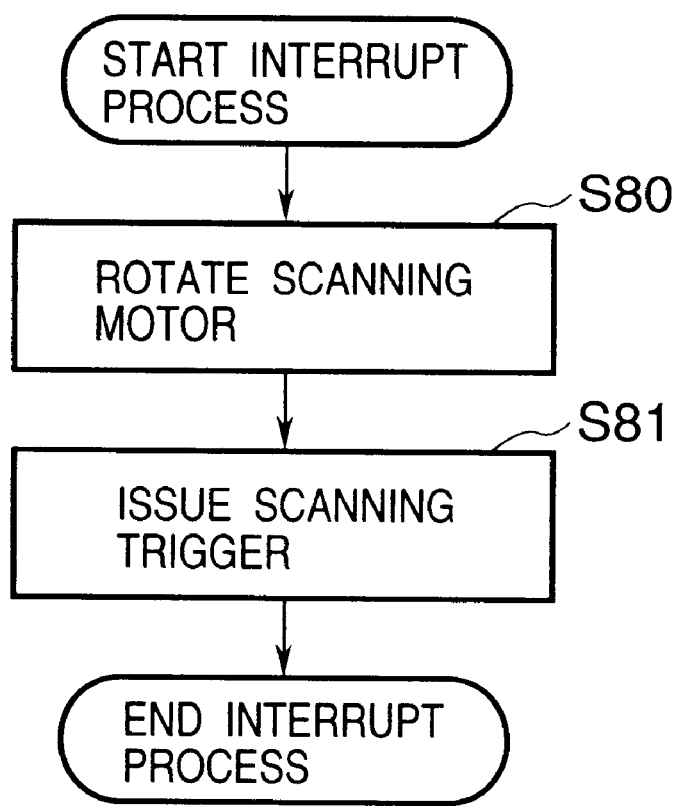
FIG. 20 is a flow chart showing an interrupt process executed parallel to the process shown in FIG. 19.

Encoding upon transmitting a color image by a sheet scan, i.e., by scanning an original while the hand scanner unit (HSU) 125 is attached to the apparatus main body will be explained below. FIG. 19 is a flow chart showing processes from scanning of an original image by a sheet scan until transmission of the image, and FIG. 20 is a flow chart showing an interrupt process. Programs corresponding to these processes are stored in the ROM 121, and are executed by the CPU 11.

Upon receiving an encoding start command from the communication task 25, the encoding/decoding task 27 resets a scanned line counter Lcnt on the SRAM 124 to "0" to permit an interrupt generated approximately every 2.5 msec. In this manner, an interrupt is enabled, and an interrupt process shown in FIG. 20 is executed every time an interrupt is generated.

In step S80 in FIG. 20, a scanning motor (not shown) is driven at a scanning trigger timing defined by the interrupt process generated approximately every 2.5 msec. In step S81, a scanning trigger is issued to the image processor 114. In response to this trigger, the image processor 114 executes A/D conversion and image processing of color image data of an original image scanned by the contact sensor (CS) 112. After the image processing, the color image data is written in the line buffer on the DRAM 118 in the order of R, G, and B via the DMA controller 117.

The encoding/decoding task 27 monitors in step S72 if image data is written in the line buffer. If YES in step S72, the encoding/decoding task 27 encodes that image data by a known encoding process based on DPCM (steps S73 to S75). In step S76, the task 27 appends an EOL code of a Huffman code (see FIG. 17B). In step S77, the task 27 writes the encoded data in the communication buffer on the DRAM 118, and increments the scanned line counter Lcnt. The flow then advances to step S78 to check if the value of the scanned line counter Lcnt is equal to or larger than a predetermined value. If YES in step S78, the processing ends. On the other hand, if NO in step S78, the flow advances to step S79 to check end of an original. If NO in step S79, the flow returns to step S72 and the aforementioned process is repeated. Upon detection of end of the original, encoding ends.

[Decoding of Color Image]

Figure 21:
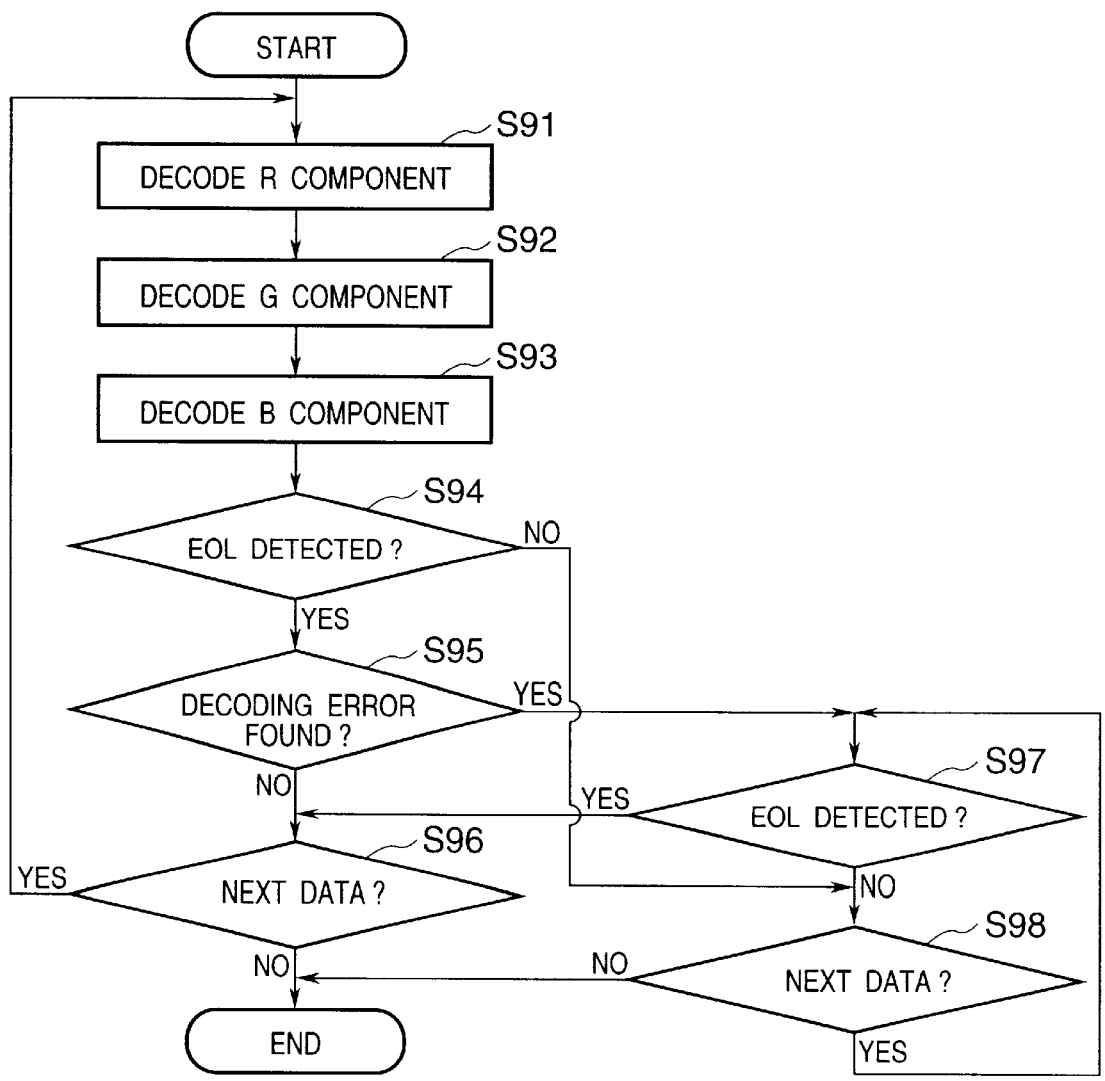
FIG. 21 is a flow chart showing a decoding process of a color image.

Encoding upon transmitting a color image has been explained, and decoding of a received color image will also be explained. FIG. 21 is a flow chart showing the decoding process of a received color image, and a program corresponding to this process is stored in the ROM 121 and is executed by the CPU 11.

Code data which are stored in the image memory on the DRAM 118 and correspond to a received image are read out, and are decoded by a known decoding process based on DPCM in the order of R, G, and B (steps S91 to S93). The decoded image data are stored in the line buffer on the DRAM 118 in units of R, G, and B components. Since the encoded image data is appended with an EOL code of a Huffman code after the B component, as described above, it is checked in step S94 if an EOL code is detected. If NO in step S94, the flow advances to step S98, and a search is made in steps S98 and S97 until the next EOL code is detected.

If it is determined in steps S94, S95, and S96 that an EOL code is detected, no decoding error is detected, and the next data is present, the flow returns to step S91 to execute the decoding process for the next line in the same manner as described above.

If no EOL code is detected, and image data comes to an end during the search in steps S98 and S97, the decoding process ends. Even when an error has occurred during decoding, the flow advances to step S97 in the same manner as in a case wherein an EOL code cannot be detected, and if the next EOL code can be detected, the flow advances to step S96 to resume the decoding process from the next line. Such process is repeated to the end of the received image data, thus decoding the received image.

[Color Image Communication Using BFT]

The operation of a color image communication program using Binary File Transfer (BFT) of the ITU-T recommendation, which is installed in the image communication apparatus of the second embodiment, will be explained below.

BFT is an error-free transmission scheme of a binary file, e.g., a data file created by a personal computer or the like by the Error Correction Mode (ECM) transmission protocol. The procedure of such image communication will be explained below with reference to FIGS. 22 to 25.

Figure 22:
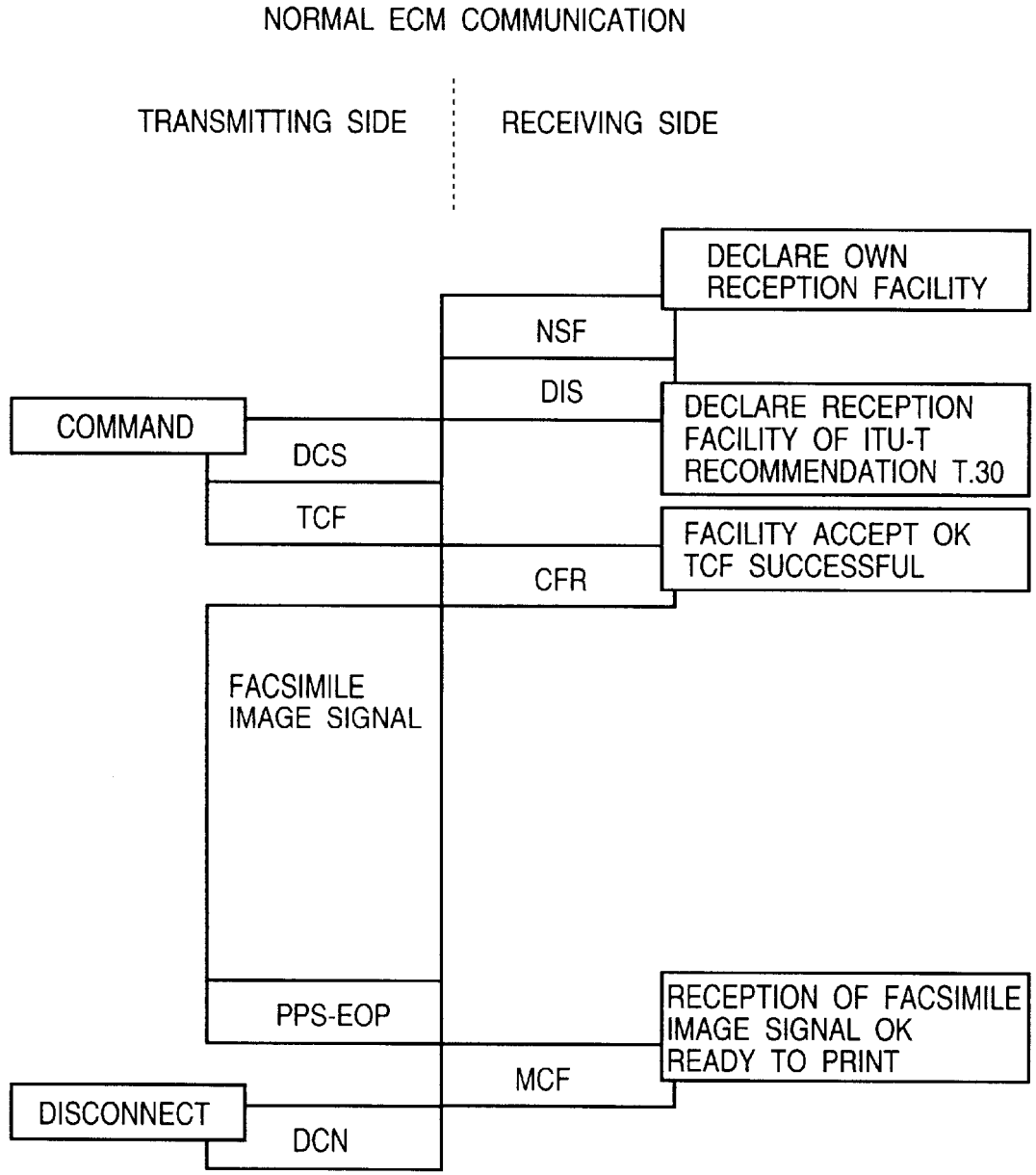
FIG. 22 is a chart for explaining a normal ECM communication procedure.

FIG. 22 is a chart for explaining a communication procedure in a normal ECM communication.

The receiving facsimile apparatus declares its own reception facilities by NSF (Non-Standard Facilities), and declares by DIS (Digital Identification Signal) that it has reception facilities of the ITU-T recommendation T.30. In response to these declarations, the transmitting facsimile apparatus sends DCS (Digital Command Signal) and TCF (Training Check), and the receiving apparatus sends back CFR (Confirmation to Receive). In this manner, the receiving apparatus receives a facsimile image signal, and informs the transmitting apparatus of completion of reception of the facsimile image signal and a print ready message by MCF (Message of Confirmation) in response to a signal PPS (Partial Page Signal)-EOP (End of Procedure) indicating end of the procedure. In this manner, the transmitting apparatus sends DCN (Disconnect), thus terminating the ECM communication.

Figure 23:
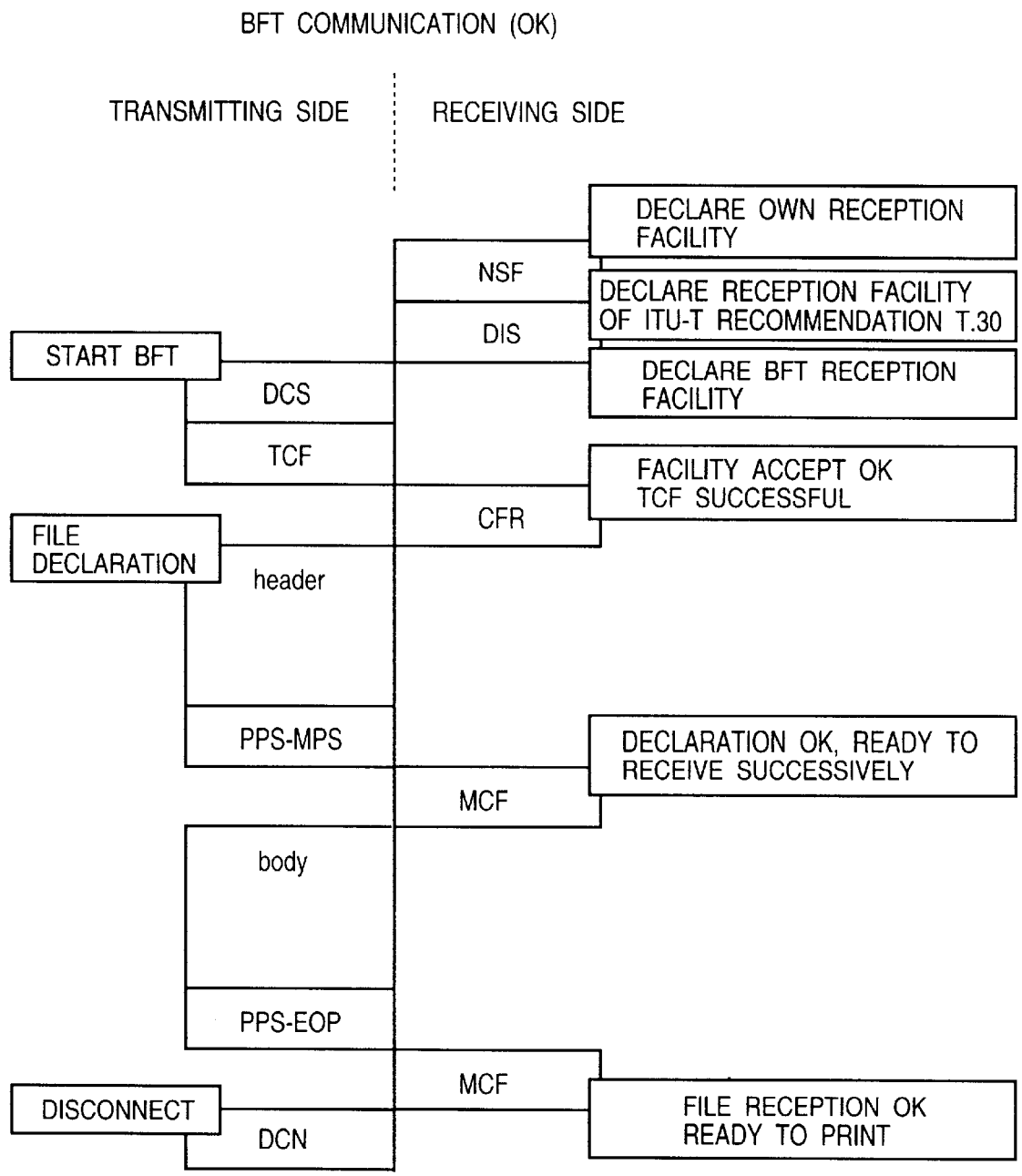
FIG. 23 is a chart for explaining a BFT communication procedure (normal)

FIG. 23 is a chart for explaining the communication procedure (normal communication) in the BFT communication.

The receiving facsimile apparatus declares its own reception facilities by NSF, and declares by DIS that it has reception facilities of the ITU-T recommendation T.30. In response to these declarations, the transmitting facsimile apparatus instructs start of a BFT communication by DCS and sends TCF, and the receiving apparatus sends back CFR. Upon receiving CFR, the transmitting apparatus sends a BFT header to declare start of transmission of a data file. In this manner, upon receiving a signal PPS-MPS (Multi-Page Signal) indicating an interruption, the receiving apparatus informs the transmitting apparatus by MCF that it is ready to proceed with reception. In response to MCF, the transmitting apparatus sends the body of the data file. Upon receiving a signal PPS-EOP indicating the end of data, the receiving apparatus sends back completion of reception and a print ready message by MCF. The transmitting apparatus sends DCN to normally terminate the BFT communication.

Figure 24:
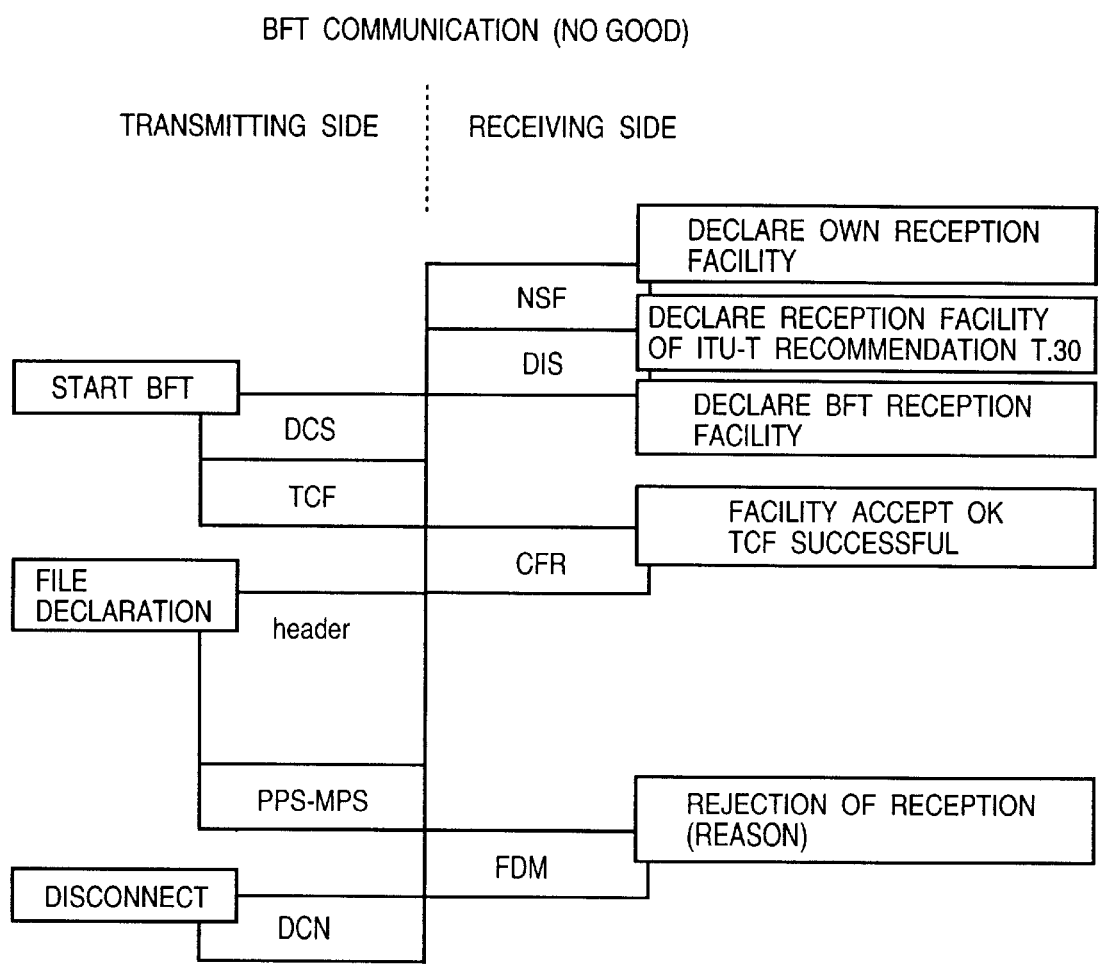
FIG. 24 is a chart for explaining a BFT communication procedure (terminated by rejection)

FIG. 24 is a chart for explaining the communication procedure (rejection) in the BFT communication. In an example shown in FIG. 24, when the receiving apparatus receives a BFT header and then a signal PPS-MPS indicating interruption, it informs the transmitting apparatus by a signal FDM indicating rejection of reception that it cannot proceed with reception.

The reasons for rejection of reception in the receiving apparatus are as follows.

(a) The receiving apparatus has no compression/expansion (encoding/decoding) facilities designated by the transmitting apparatus.

(b) The receiving apparatus cannot print data to be received with the designated sub-scanning width.

(c) The receiving apparatus cannot store data to be received with the designated file size.

(d) The receiving apparatus cannot print data to be received with the designated unit dot system.

Figure 25:
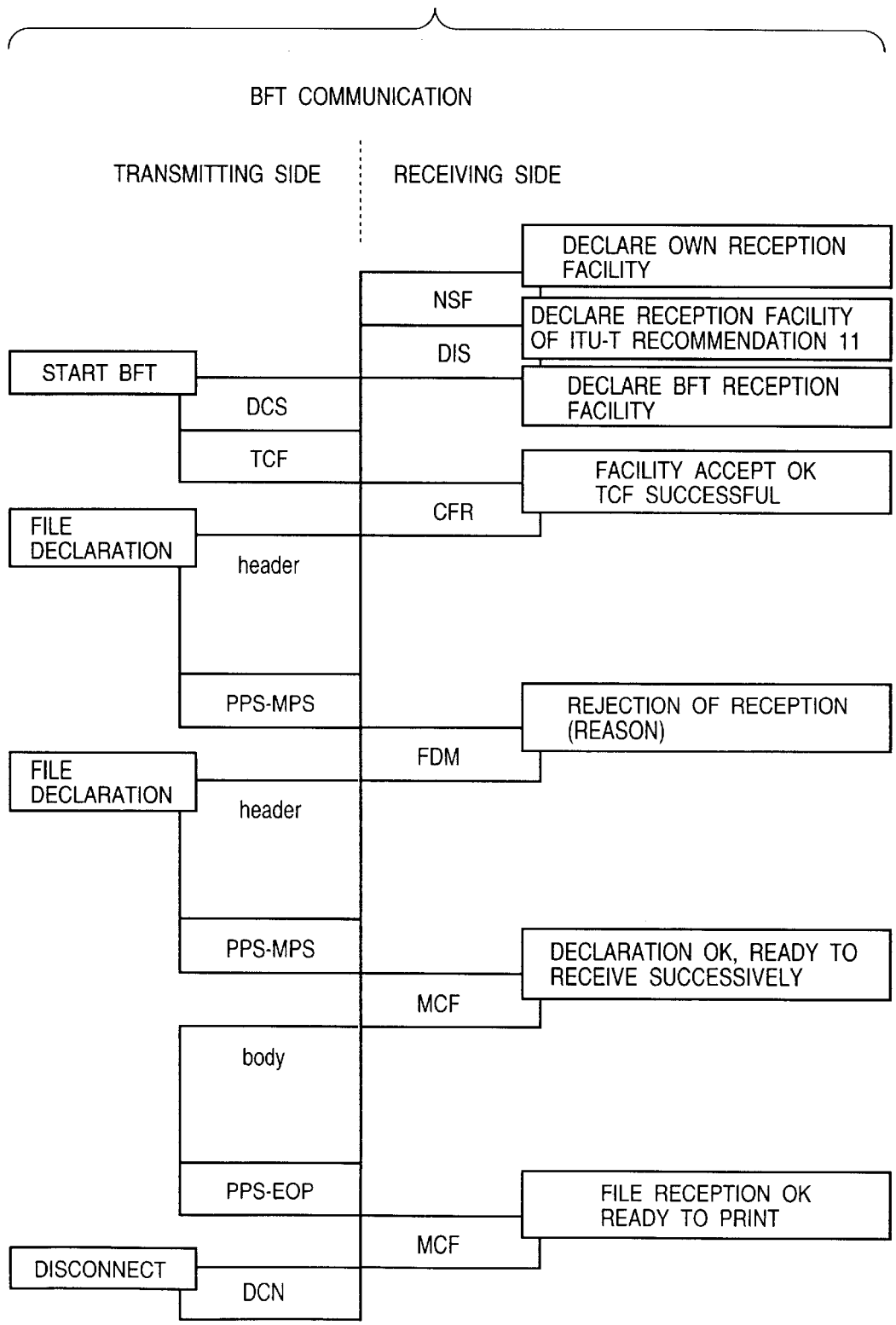
FIG. 25 is a chart for explaining a BFT communication procedure (recovered from rejection)

FIG. 25 is a chart for explaining the communication procedure in the BFT communication, especially, a recovery procedure from rejection of reception.

In an example shown in FIG. 25, when the receiving apparatus receives a BFT header and then a signal PPS-MPS indicating interruption, it informs the transmitting apparatus by a signal FDM indicating rejection of reception that it cannot proceed with reception, in the same manner as in FIG. 24. After that, the transmitting apparatus analyzes the reasons for rejection of rejection, and re-declares a file whose format has been changed in accordance with the analysis result. Then, the transmitting apparatus sends a BFT header with the new format and the body of the data file. In this manner, the receiving apparatus sends back completion of reception and a print ready message by MCF. The transmitting apparatus sends DCN to normally terminate the BFT communication.

FIG. 26 is a view for explaining BFT header information according to the ITU-T recommendation. Referring to FIG. 26, reference numeral 1800 denotes BFT header information used in a color image communication by the image communication apparatus of the second embodiment.

The image communication apparatus of the second embodiment follows the communication procedure of the ITU-T recommendation, i.e., it sends only a BFT header (see FIG. 27) in advance to the receiving terminal using simple BFT as a procedure for implementing the BFT communication, and sends the body of the data file upon reception of MCF (Message of Confirmation) from the receiving terminal. That is, in the second embodiment, the encoding/decoding task 27 sends color image data encoded by DPCM as a data file according to the simple BFT protocol.

Figure 28:
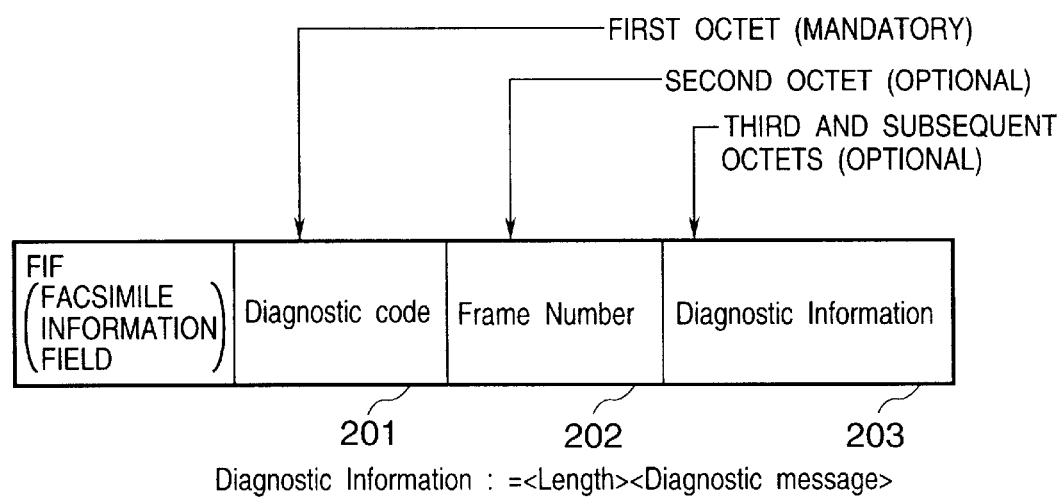
FIG. 28 is a view for explaining the format of an FDM signal specified by the ITU-T recommendation.

FIG. 28 shows the format of the signal (FDM) that sends back a reason for rejection of reception from the receiving apparatus to the transmitting apparatus in FIG. 25.

Referring to FIG. 28, reference numeral 201 denotes an area called a first octet, which expresses a diagnostic code by 1 byte. In the apparatus of the second embodiment, "no reason" is set in this area. Reference numeral 202 denotes a second octet in which optional information is set. In the apparatus of the second embodiment, the following reception rejection reason information is set using diagnostic information in the third and subsequent octets.

(a) No designated compression/expansion facilities "No Compatible Compression"

(b) Cannot Print with designated main scanning width "Illegal Horizontal Size"

(c) Too large file size "File Too Large"

[Operation Upon Transmitting Color Image]

Figure 29:
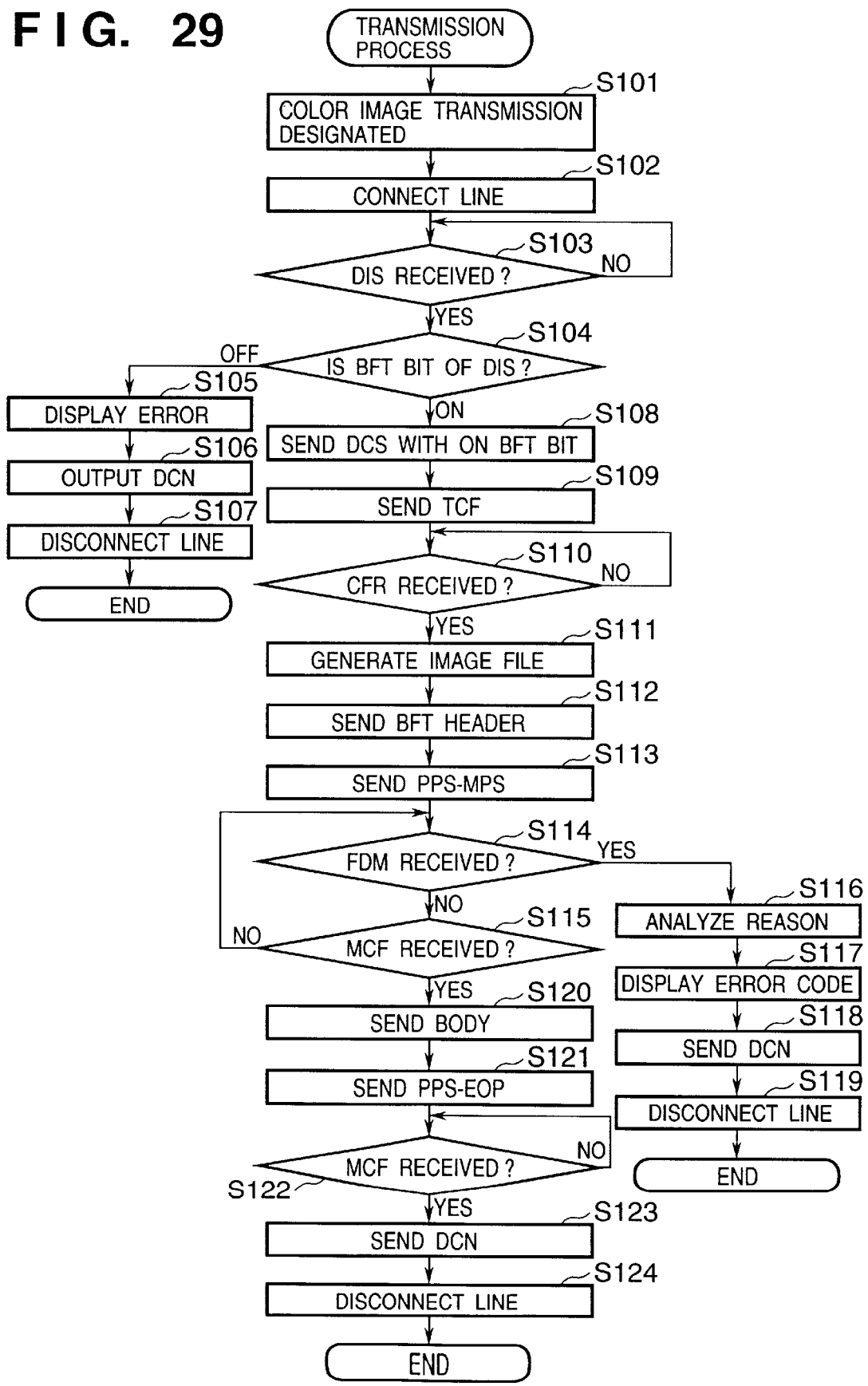
FIG. 29 is a flow chart showing a transmission process in the facsimile apparatus of the second embodiment.

FIG. 29 is a flow chart showing the transmission procedure of a color image in the image communication apparatus of the second embodiment. Note that a program corresponding to this communication procedure is stored in the ROM 121, and is executed by the CPU 11. Also, the program for transmitting a color image is comprised of multi-tasks, as shown in FIG. 2, but will be explained in accordance with the flow chart in FIG. 29 for the sake of simplicity.

If color image transmission is instructed in step S101, this instruction is detected by the status monitoring task 21, and the line control task 23 is started. In step S102, the line control task 23 connects a line, places a call to the designated destination of an image, and starts the communication task 25. The flow then advances to step S103, and the communication task 25 monitors if DIS specified by the ITU-T recommendation T.30 is received from the receiving terminal. Upon receiving DIS, the communication task 25 checks in step S104 if the receiving terminal has the BFT communication protocol specified by the ITU-T recommendation T.30.

In the second embodiment, the presence/absence of the BFT mode is detected in step S104 by DIS of the ITU-T recommendation T.30. If faster communication is required, an Ansam signal of the known ITU-T recommendation V.8 protocol is detected, and a CM signal is then output to start the V.34 protocol so as to detect the facilities of the receiving apparatus.

If the receiving terminal does not have any BFT communication protocol, the communication task 25 determines that it cannot make a color image communication with the receiving terminal, and the flow advances to step S105. In step S105, an error display is made to inform the user of the own apparatus of an error. The communication task 25 sends DCN to the receiving apparatus in step S106, and the line control task 23 disconnects the line in step S107.

On the other hand, if the receiving terminal has the BFT communication protocol, the flow advances to step S108, and the communication task 25 starts a transmission protocol since a transmission request is included in the image record passed from the operate task 22. The communication task 25 allows to set a bit indicating a color image on the image record, and sends DCS with ON simple BFT bit specified by the ITU-T recommendation T.30 so as to transmit a color image according to the BFT communication protocol. In this case, necessary bits indicating the resolution, encoding scheme, and original size declare "standard", "MH coding", and "A4 width" irrespective of those of a color image actually transmitted in the BFT mode. These necessary bits are not limited to the above contents but may declare, e.g., "superfine", "MMR coding", and A3 width".

The communication task 25 then sends TCF in step S109, and monitors in step S110 if it receives CFR from the receiving terminal. Upon receiving CFR, the flow advances to step S111 to start the encoding/decoding task 27, thus generating a data file to be transmitted. That is, a BFT header shown in FIG. 27 and a body of a data file obtained by encoding a color image by DPCM are generated, and operation for actually transmitting the data file to the receiving terminal is started.

Generation of a file name will be explained below. The file name of the data file to be sent is generated so as not to send data files with identical file names because a data file received by the receiving terminal may be passed to, e.g., a personal computer or the like. In the apparatus of the second embodiment, a numerical value counter which is incremented every time a data file is sent is prepared, count information of this counter is converted into a character string, and the converted character string can be used as a file name. Also, character strings of specific patterns, e.g., "HAPPY BIRTHDAY", "THANKS", and the like may be prepared, and the user may select one of them upon inputting a transmission instruction. The selected character string may be used in a file name, and "THANKS.CDP" may be generated. Furthermore, a character string may be generated from date information and may be used as a file name. In the apparatus of the second embodiment, these character strings are combined to generate unique file names in units of communications. For example, FIG. 27 exemplifies "THANKSxxxyyy.CDP" as a file name (file-name), where xxx is the time information and yyy is the total counter value.

Furthermore, the resolution, encoding scheme, original size, and the like of a color image to be actually sent in the BFT mode are generated together with the file name. In this example, both the main scanning and sub-scanning resolutions are 90 dpi ¼ the resolution of 360 dpi of a home use printer, the encoding scheme is DPCM, and the image size is 360 mm (width)×540 mm (length) which can cover an L-size photograph, postcard, and the like as appropriate color image sizes for home use. None of these resolution, encoding scheme, and original size are specified by the ITU-T recommendation T.30. Of course, one or two of the resolution, encoding scheme, and original size may be one or ones specified by the ITU-T recommendation T.30. Since the receiving terminal prints such file name or the like as the footer (or header) of a received image, it can serve as an ID of the received color image, and can serve as very effective management information for the user.

In step S112, the BFT header containing the file name and file name extension is sent as ECM high-speed data. In step S113, PPS-MPS is sent to send the body of the data file. As will be explained later in the paragraphs of reception operation, if the receiving apparatus is ready to receive, it sends back MCF; if the receiving apparatus cannot receive owing to some problems, it sends back rejection of reception and its reason by FDM.

Upon receiving FDM in step S114, the flow advances to step S116, and the communication task 25 analyzes the reason for rejection of reception. In step S117, the communication task 25 displays an error code indicating the reason for rejection of the BFT communication. The user can know the reason for rejection of reception from that error code, e.g., if the receiving apparatus cannot receive any data file because of the memory which is full of data, cannot process image attributes informed in the BFT header, and so forth. After that, DCN is sent to the receiving apparatus in step S118, and the line is disconnected in step S119.

Upon receiving MCF in step S115, the flow advances to step S120, and the communication task 25 makes the encoding/decoding task 27 encode image data and sends the encoded data to the receiving apparatus as the body of the data file. The flow advances to step S121, and the communication task 25 sends PPS-EOP. Upon receiving MCF from the receiving apparatus in step S122, the communication task 25 sends DCN in step S123, and the line control task 24 disconnects the line in step S124.

In the procedure described above, image attribute information which is not specified by the ITU-T recommendation T.30 is sent to the communication partner using information in the BFT header in a phase for transmitting image information in the BFT protocol without using any non-standard protocol. In place of the BFT protocol, upon transmitting image information encoded by an encoding scheme such as JPEG, JBIG, or the like, image attribute information which is not specified by the ITU-T recommendation T.30 can be sent to the communication partner using the header field in a phase for transmitting image information after DCS, without using any non-standard protocol. In this case, step S104 is replaced by the step of checking if the communication partner is capable of receiving image information encoded by JPEG, JBIG, or the like, in place of the step of checking if the communication partner has the BFT protocol. Also, step S108 is replaced by the step of sending DCS with ON bit corresponding to JPEG or JBIG in place of the step of sending DCS with ON BFT bit.

Figure 32:
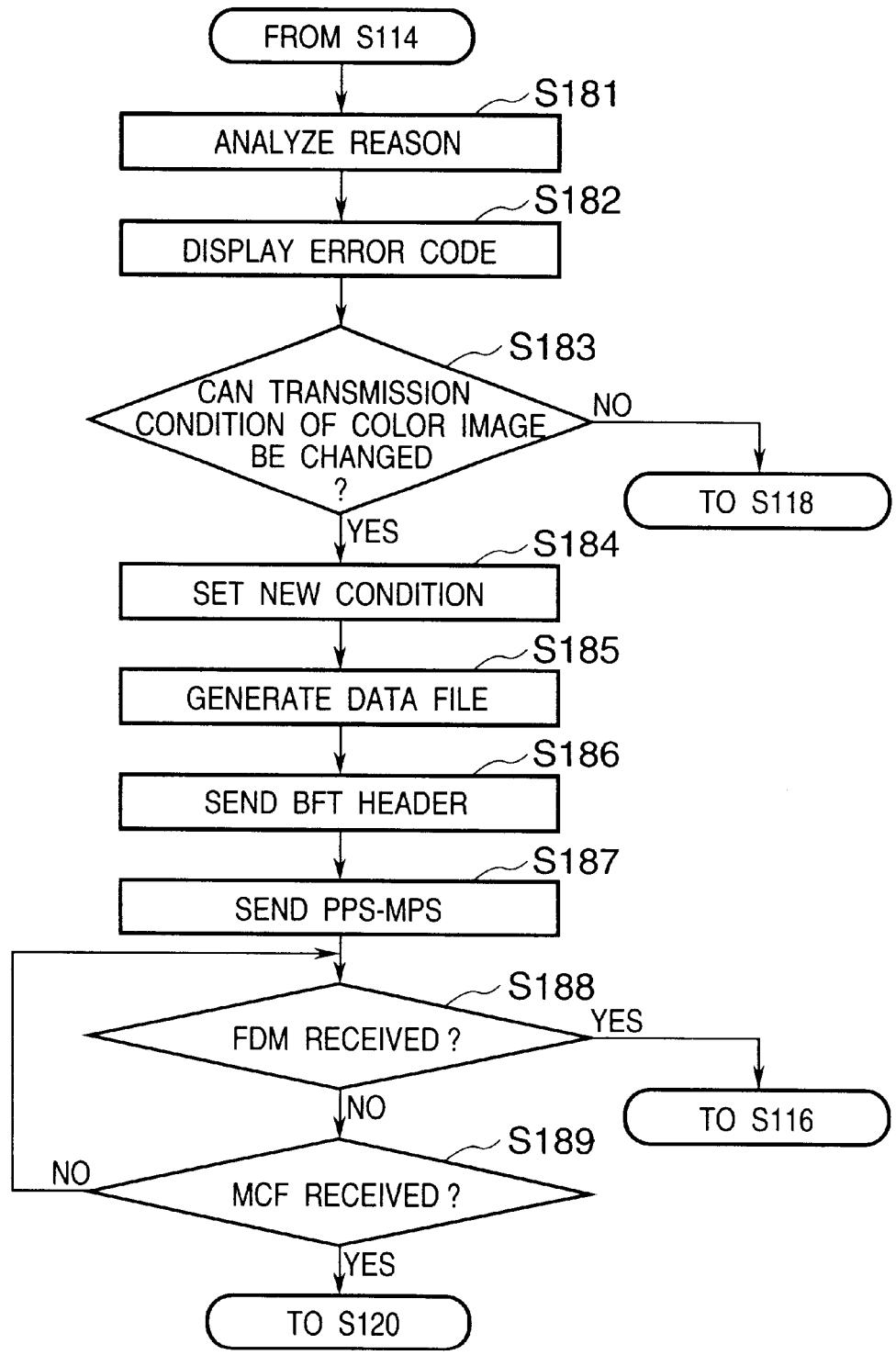
FIG. 32 is a flow chart showing a transmission process upon implementing the procedure shown in FIG. 25 in the facsimile apparatus of the second embodiment.

FIG. 32 is a flow chart showing another processing upon receiving FDM in step S114 shown in FIG. 29. That is, the procedure shown in FIG. 32 is started upon receiving FDM in step S114.

The communication task 25 analyzes the reason for rejection of reception contained in FDM received in step S181, and displays an error code corresponding to that reason on the LCD display 36 in step S182 to inform the user of the error. The communication task 25 checks in step S183 if the transmission conditions (resolution, encoding scheme, and the like) of a color image can be changed. For example, when the resolution alone is the reason for rejection, the task 25 checks if the resolution can be changed (lowered). Or when the encoding scheme is the reason for rejection, the task 25 checks if the encoding/decoding task 27 can encode data using another encoding scheme.

If the communication task 25 determines that the transmission conditions of the color image cannot be changed, the flow advances to step S118 in FIG. 29 to suspend transmission of a color image. On the other hand, if the transmission conditions of the color image can be changed, the communication task 25 sets new conditions (resolution, encoding scheme, and the like) in step S184, and generates a new BFT header and data file based on those condition in step S185. Subsequently, the task 25 sends the BFT header in step S186, and sends PPS-MPS in step S187 to send the body of the data file.

Upon receiving FDM again in step S188, the flow advances to step S116 in FIG. 29 to suspend transmission of a color image in the aforementioned procedure. On the other hand, upon receiving MCF in step S189, the flow advances to step S120 in FIG. 29 to transmit a color image in the aforementioned procedure.

[Operation Upon Receiving Image]

Figure 30:
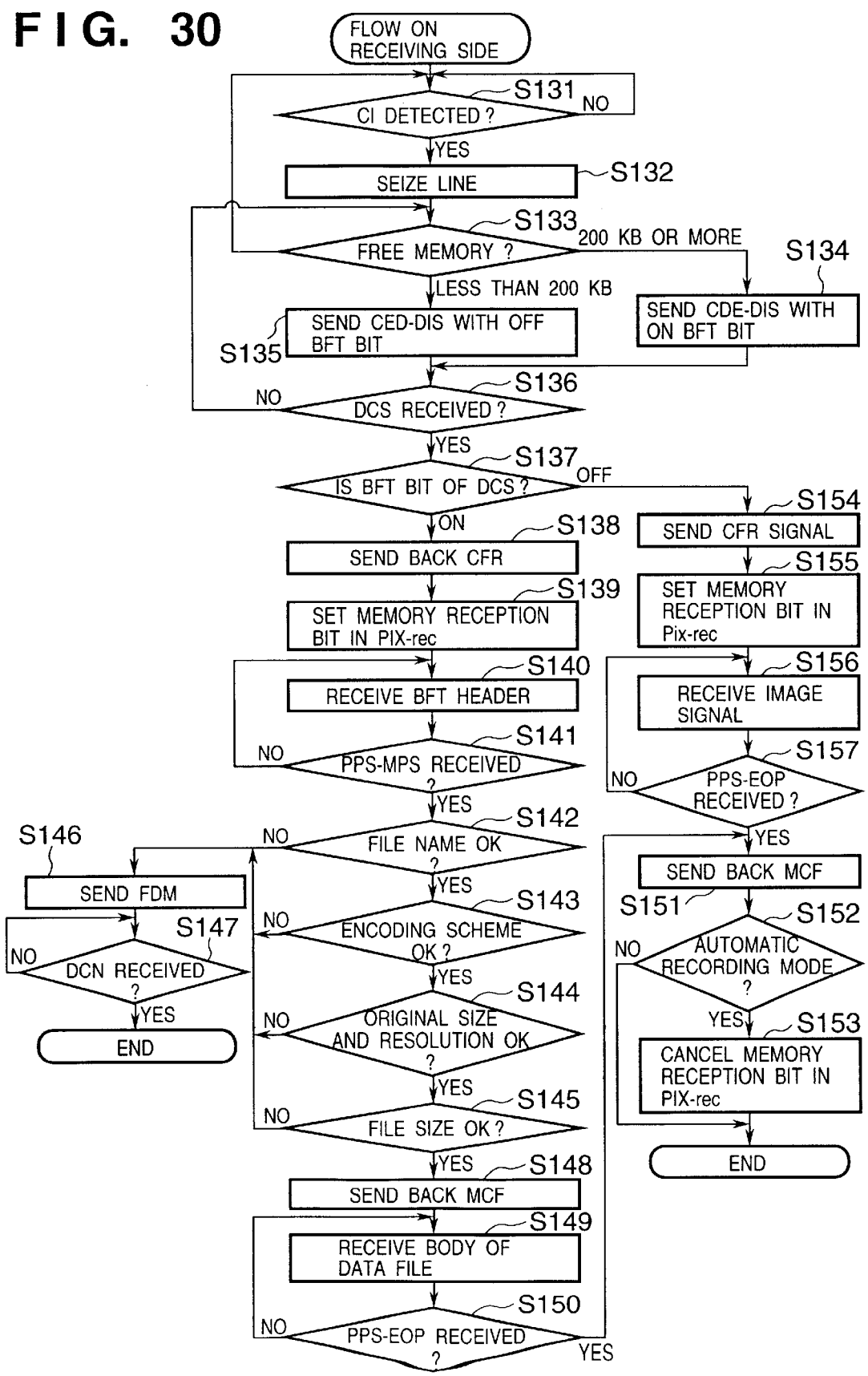
FIG. 30 is a flow chart showing a reception process in the facsimile apparatus of the second embodiment.

Operation upon receiving a color or monochrome image in the image communication apparatus of the second embodiment will be explained in detail below. FIG. 30 is a flow chart showing the communication procedure upon receiving a color or monochrome image in the image communication apparatus of the second embodiment. Note that a program corresponding to this communication procedure is stored in the ROM 121, and is executed by the CPU 11. Also, the program for transmitting a color image is comprised of multi-tasks, as shown in FIG. 2, but will be explained in accordance with the flow chart in FIG. 30 for the sake of simplicity.

The line control task 23 monitors in step S131 if a CI signal arrives from the line. Upon detecting a CI signal, the line control task 23 seizes the line in step S132. At this time, if automatic reception is set, the communication task 25 is started. Thus, the flow advances to step S133, and the communication task 25 checks the use state of the memory (DRAM 118). The apparatus of the second embodiment changes in accordance with the memory size its own facilities that the communication partner is informed by DIS of the ITU-T recommendation T.30. That is, if the memory has a free space equal to or larger than 200 kBytes, the communication task 25 informs the transmitting apparatus of the presence of receiving facilities of a color image in step S134. However, if the memory has a free space less than 200 kBytes, the communication task 25 inhibits reception of a color image in step S135.

More specifically, the communication task 25 declares the presence of the BFT protocol by DIS with ON BFT bit, thus informing the transmitting apparatus that the receiving apparatus is capable of receiving a color image (step S134). As a result, a color image having an appropriate size for home use, and a monochrome image can be received. On the other hand, if the free space of the memory is less than 200 kBytes, the task 25 does not declare the presence of the BFT protocol since it cannot receive even a color image having an appropriate size for home use, but sends DIS since it can receive a monochrome image (step S135). Furthermore, if the free space of the memory is less than 20 kBytes, the flow returns to step S131 without executing any facsimile reception, i.e., without outputting DIS itself. In this manner, the task 25 repetitively sends DIS until it receives DCS in step S136, and waits for DCS indicating a reception command or DTC (Digital Transmit Command) indicating a transmission command sent from the transmitting apparatus.

DIS sent from the receiving apparatus to the transmitting apparatus is appended with information indicating reception facilities of the receiving apparatus such as ECM, BFT, resolution, encoding scheme, image size, and the like. DIS containing such facility declaration is received by the transmitting apparatus, and reception is instructed by DCS (step S136). In case of normal transmission, DCS is appended with information indicating ECM, encoding scheme, original size, resolution, and the like.

In the apparatus of the second embodiment, BFT declaration is that for receiving a color image file. Also, the reason why two, color and monochrome threshold levels of the memory free space are set as criteria upon deciding the possibility of reception is to prevent image data to be received from overflowing the free area of the memory, since the data size per page of a color image is larger than that of a monochrome image. In other words, when only one threshold level for deciding the possibility of reception is set, reception of a monochrome image may be rejected even though the memory has a free area capable of receiving a monochrome image, or reception of a color image may be executed even though an available free area of the memory can receive a monochrome image but cannot receive and store a color image.

The communication task 25 checks based on received DCS in step S137 if the transmitting apparatus is about to send a color image in the BFT protocol. If the transmitting apparatus is about to send a color image in the BFT protocol, the simple BFT bit in DCS is ON to start the BFT mode. Furthermore, based on the ITU-T recommendation T.30, since indication information of the encoding scheme, original size, resolution, and the like is mandatory in DCS, DCS contains information such as the encoding scheme, original size, resolution, and the like specified by the ITU-T recommendation T.30 which do not always match those of a color image to be actually sent in the BFT protocol.

If training by TCF succeeds, color image reception in the BFT mode is instructed by DCS, and the apparatus is ready to start the BFT mode and to receive a color image, the flow advances to step S138, and the communication task 25 sends back CFR. The flow then advances to step S139 to set a memory reception bit in a record PIX-rec indicating a received image. Note that the memory reception bit indicates that a non-recorded image is stored in the image memory on the DRAM 118.

Upon receiving the response CFR, the transmitting apparatus sends a BFT header indicating the profile of color image information to be sent in the same as that for transmitting image information. The BFT header complies with the ITU-T recommendation T434. The communication task 25 receives the BFT header in step S140, and checks in step S141 if PPS-MPS indicating that the body of the data file is to be sent successively is received.

Upon receiving PPS-MPS, the communication task 25 refers to the file name extension in the BFT header to check if the file name conforms to a predetermined format (step S142), if the encoding scheme is DPCM (step S143), if the original size is 360 mm (width)×540 mm (length) that can cover an L-size photograph, postcard, and the like, and both the main scanning and sub-scanning resolutions are 90 dpi (step S144), if the file size of an image to be transmitted is the one that can be received (step S145), and so forth. By adding the file size to discrimination conditions of reception, whether or not an image can be received can be determined at the time of reception of the BFT header, and image reception can be prevented from being disabled due to no free memory area after the telephone line is seized for a long period of time, which may occur when no discrimination based on the file size is made. Especially, in case of a color image with a large data size to be sent, the effect of discrimination based on the file size is remarkable. At this time, whether or not the file is decodable is checked also with reference to an application reference and the like, as described in the ITU-T recommendation.

In this way, if it is determined that the data file to be received is undecodable or cannot be received, the flow advances to step S146, and FDM is sent back. The contents of FDM are described in the ITU-T recommendation T434. As the contents of rejection of reception, the above-mentioned information indicating "insufficient memory size" or "small free memory space", or information indicating mismatch of resolution, encoding scheme, or the like may be sent to the transmitting apparatus. With such information, the transmitting apparatus can find out a way to enable transmission in place of detecting information merely indicating that transmission is disabled, and can take appropriate measure in accordance with that information. Note that FDM can be expanded with reference to header information without posing any problems in terms of the protocol.

The flow then advances to step S147, and upon receiving DCN, the communication task 25 instructs the line control task 23 to disconnect the line. Although not shown in FIG. 30, if the BFT header is received again, the flow returns to step S141, and the communication task 25 checks again if a data file declared by the transmitting apparatus can be received.

On the other hand, if it is determined that the data file to be received is decodable, and it is ready to receive a color image, the flow advances to step S148, and MCF is sent back to the transmitting apparatus. In response to MCF, the transmitting apparatus starts a transmission process of the body of the data file. The receiving apparatus sets ON a color image identification bit in image record management information to receive the data file of a color image, generates a page record, and links the image record with the page record. Since such information has already been described in detail in the paragraphs of print operation of a received image, a description thereof will be omitted here.

In this manner, the body of the data file sent from the transmitting apparatus is received in step S149. The body of the data file is set with information indicating the number of main scanning pixels and the number of sub-scanning pixels, and image data compressed by DPCM follows such information. The number of main scanning pixels and the number of sub-scanning pixels are set on the page recorded generated previously. By setting such information on the page record, other tasks such as the recording task 29 and the like can refer to them. At the same time, by recording the information of the BFT header, the number of main scanning pixels, and the number of sub-scanning pixels in an image file intact, even when the image data is demultiplexed from information that follows the protocol, that image data can be solely mapped as an image. For example, when this image file is passed to a personal computer, an image can be reproduced on the personal computer.

Conversely, in case of a receiving terminal which can only print a received image, after such information is transferred to the page record, an image file may be formed by excluding information appended to image data. In this manner, the recording task 29 need not demultiplex header information, and printing can be done more simply. In other words, such process is close to a normal reception process in a monochrome image communication.

Note that image data is normally sent while being encoded by DPCM and formatted by HDLC (High level Data Link Control) as in ECM. With this format, any error can be detected if it occurs. The receiving apparatus begins to receive a Q signal upon receiving RCP (Return to Control for Partial page). Upon receiving PPS-EOP indicating end of communication data, the flow advances from step S150 to step S151, and MCF indicating received data is free from any error is sent back if no error is found in the received data. Upon receiving DCN, the communication task 25 controls the line control task 23 to disconnect the line, thus ending the communication (not shown).

The flow then advances to step S152, and the communication task 25 checks if a mode for automatically recording the received image is selected. If the automatic recording mode is not selected, the processing ends. On the other hand, if the automatic recording mode is selected, the flow advances to step S153 to cancel (turn off) the memory reception bit in PIX-rec, thus ending the processing. Furthermore, the communication task 25 closes the page record and image record.

In this manner, since a color image or an image having a non-standard size, resolution, or encoding scheme in the ITU-T recommendation can be transmitted in a highly compatible standard protocol without using any non-standard protocol, image communications between models of different manufacturers can be made, and high-quality image data can be quickly sent with an appropriate data size corresponding to the image size. Furthermore, image communications that can facilitate image processing at the receiving apparatus can be implemented. Even when an image having a non-standard size such as a photograph L size, postcard size, or the like in the ITU-T recommendation is to be sent, image communications which can quickly send a high-quality image with an appropriate data size, and allow image processing concordant with the resolution of the recording unit of the receiving communication apparatus can be implemented.

On the other hand, if it is determined in step S137 that the BFT bit in DCS is OFF, the flow advances to step S154, and the communication task 25 sends back a CFR signal if training by TCF succeeds and it is ready to receive an image. Subsequently, the task 25 sets a memory reception bit in PIX-rec in step S155. The flow then advances to step S156 to receive an image signal. This image signal is sent while being formatted by HDLC as in ECM. The communication task 25 proceeds to receive a Q signal upon receiving RCP. Upon reception of PPS-EOP indicating end of communication data in step S157, MCF indicating that the received data is free from any error is sent back if no error is found in the received data, as in the aforementioned color image reception in the BFT protocol. Since the subsequent steps are the same as those in the aforementioned color image reception in the BFT protocol, a description thereof will be omitted.

The communication task 25 starts the encoding/decoding task 27 to immediately decode data coming from the line, and to check the length of one main scanning line, the number of sub-scanning pixels, and the like, thus allowing to more strictly check the received image.

[Reception of Data File Other than Image]

Communications between image communication apparatuses of the second embodiment have been explained. Since the BFT protocol is a file transmission protocol, the communication partner may often be a personal computer, and various data files other than image data may be sent by declaring the BFT protocol. Such process will be explained below.

When the transmitting apparatus wants to send a data file created by software such as a spreadsheet, wordprocessor, or the like, the file name extension contained in the BFT header is, e.g., "XLS", "DOC", or the like. The receiving apparatus can confirm with reference to the file name extension if it can process the data file. As a result of confirmation, by sending back MCF or FDM in response to the next Q signal (PPS-MPS), the receiving apparatus can inform the transmitting apparatus as to whether or not it can receive that data file. The transmitting apparatus may send a BFT header again to try to send a data file with another format depending on the contents of the FDM sent back. In this case, the receiving apparatus similarly sends back MCF or FDM. However, since transmission operation of some transmitting apparatus cannot often be confirmed, the number of sent-back FDMs is counted, and when the count value has reached a predetermined value, the line is disconnected, thus preventing the BFT header and FDM from being exchanged indefinitely. More specifically, the apparatus of the second embodiment disconnects the line when it detects a predetermined number of FDMs, thus preventing the telephone line from being continuously seized with no real prospect of successful transfer.

The reason why the line is not disconnected by sending DCN immediately after transmission of a data file other than an image is declared is that the communication partner may be an upper version machine which has the same communication function as that of the image communication apparatus of the second embodiment, and a new BFT header which will be sent in response to FDM in that case must be waited for. On the other hand, if communication incompatibility is determined, it is safe to immediately disconnect the line by DCN.

If the file name extension contained in the BFT header is the same as that of a data file that can be processed by the communication apparatus of the second embodiment, since the data file declared by the BFT header can be received, the transmitting apparatus begins to send the body of the data file, as shown in FIG. 23. In this case, the communication task 25 which is receiving data refers to the configuration of the body of the data file and individual parameter values, and immediately takes a measure such as line disconnection if it finds at least one inappropriate value. This is to prevent the communication partner from wasting communication cost.

[Transmission of Monochrome Image]

Figure 31:
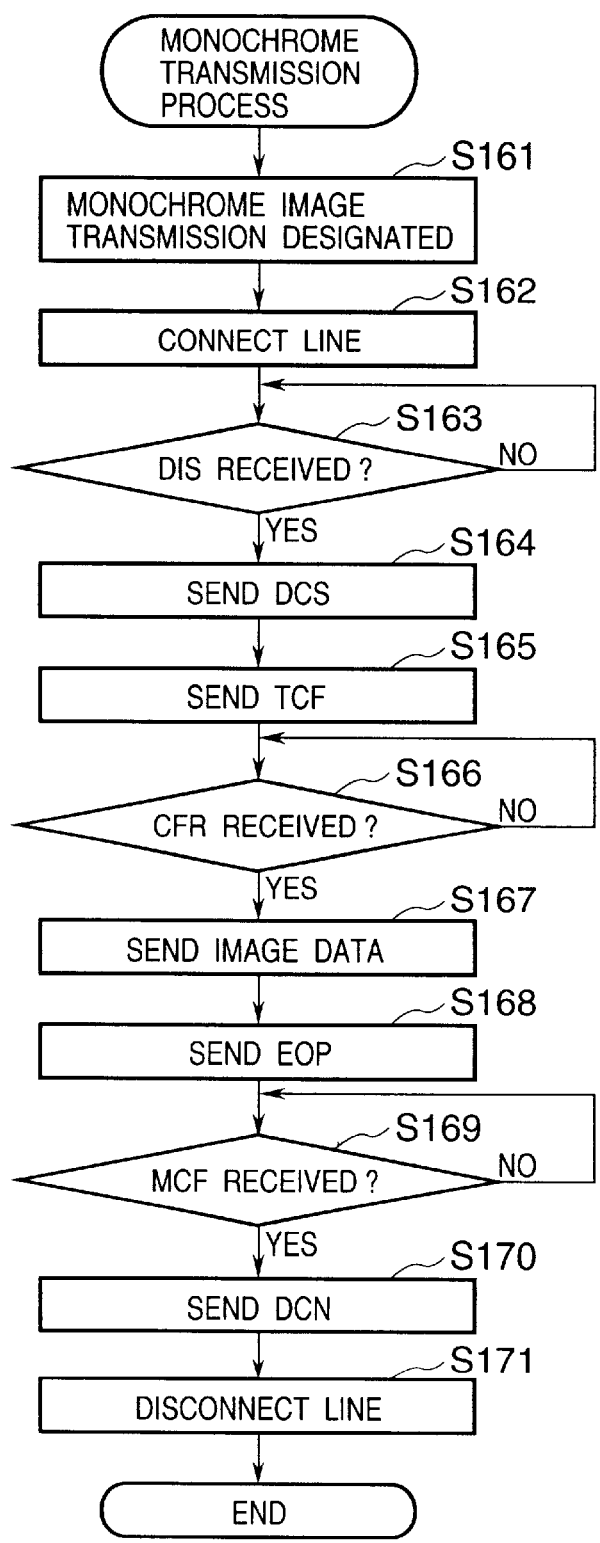
FIG. 31 is a flow chart showing a monochrome transmission process in the facsimile apparatus of the second embodiment.

The transmission procedure of a monochrome image in the image communication apparatus of the second embodiment will be described below with reference to the flow chart in FIG. 31. Note that a program corresponding to this communication procedure is stored in the ROM 121, and is executed by the CPU 11. Also, the program for transmitting a color image is comprised of multi-tasks, as shown in FIG. 2, but will be explained in accordance with the flow chart in FIG. 31 for the sake of simplicity.

If color image transmission is instructed in step S161, this instruction is detected by the status monitoring task 21, and the line control task 23 is started. In step S162, the line control task 23 connects a line, places a call to the designated destination of an image, and starts the communication task 25.

The flow then advances to step S163, and the communication task 25 checks if DIS specified by the ITU-T recommendation T.30 is received from the communication partner (receiving apparatus). Upon receiving DIS, the flow advances to step S164, and the communication task 25 sends DCS in correspondence with functions of the communication partner.

After that, the flow advances to step S165, and the communication task 25 sends TCF to train a MODEM, and monitors in step S166 if CFR is received from the communication partner. Upon receiving CFR, the flow advances to step S167, and the communication task 25 converts scanned image data into data having a resolution and main scanning width that the communication partner can receive, controls the encoding/decoding task 27 to encode the converted data by an encoding scheme that the communication partner can receive, and sends the encoded image data. If the image data to be sent comes to an end, the task 25 sends EOP in step S168. Upon receiving MCF from the communication partner in step S169, the flow advances to step S170 to output DCN. In step S171, the task 25 controls the line control task 23 to disconnect the line.

[Print Task]

Figure 33:
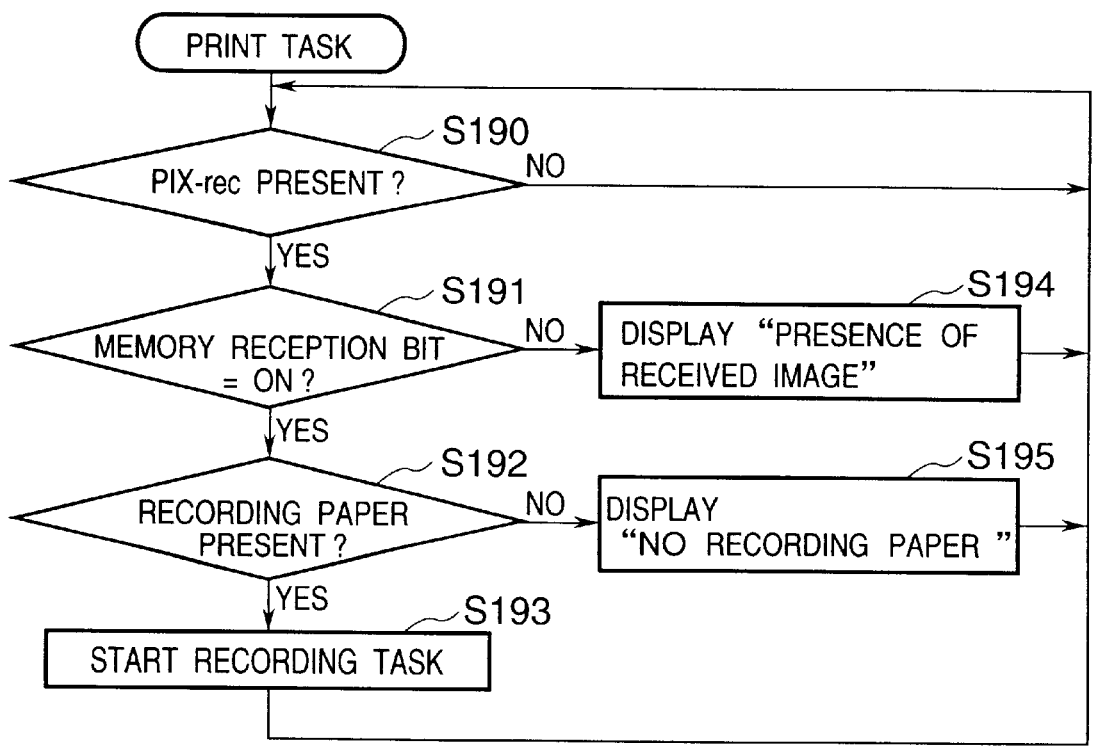
FIG. 33 is a flow chart showing a print task process in the facsimile apparatus of the second embodiment.

The operation of the print task 211 of the image communication apparatus of the second embodiment will be explained below with reference to the flow chart in FIG. 33.

The print task 211 checks based on the record PIX-rec in step S190 if image data to be printed is stored in the image memory on the DRAM 118. If no image data to be printed is stored, this processing ends without any processes. On the other hand, if image data to be printed is stored, the flow advances to step S191 to check if the memory reception bit in the record PIX-rec is set (ON). If the memory reception bit is set, the flow advances to step S192 to check if recording paper sheets are set in the recording unit 120. If recording paper sheets are set, the flow advances to step S193 to start the recording task 29, thus ending this processing.

If the memory reception bit is not set, the flow advances to step S194, and a message indicating that the received image data is stored in the memory is displayed on the LCD display 36, thus ending this processing. With this message, the user can recognize that image data remains in the memory.

On the other hand, if no recording paper sheets are set, the flow advances to step S195 to display a message indicating the absence of recording paper sheets on the LCD display 36. With this message, the user can recognize that he or she must replenish recording paper sheets.

[Status Monitoring Task]

Figure 34:
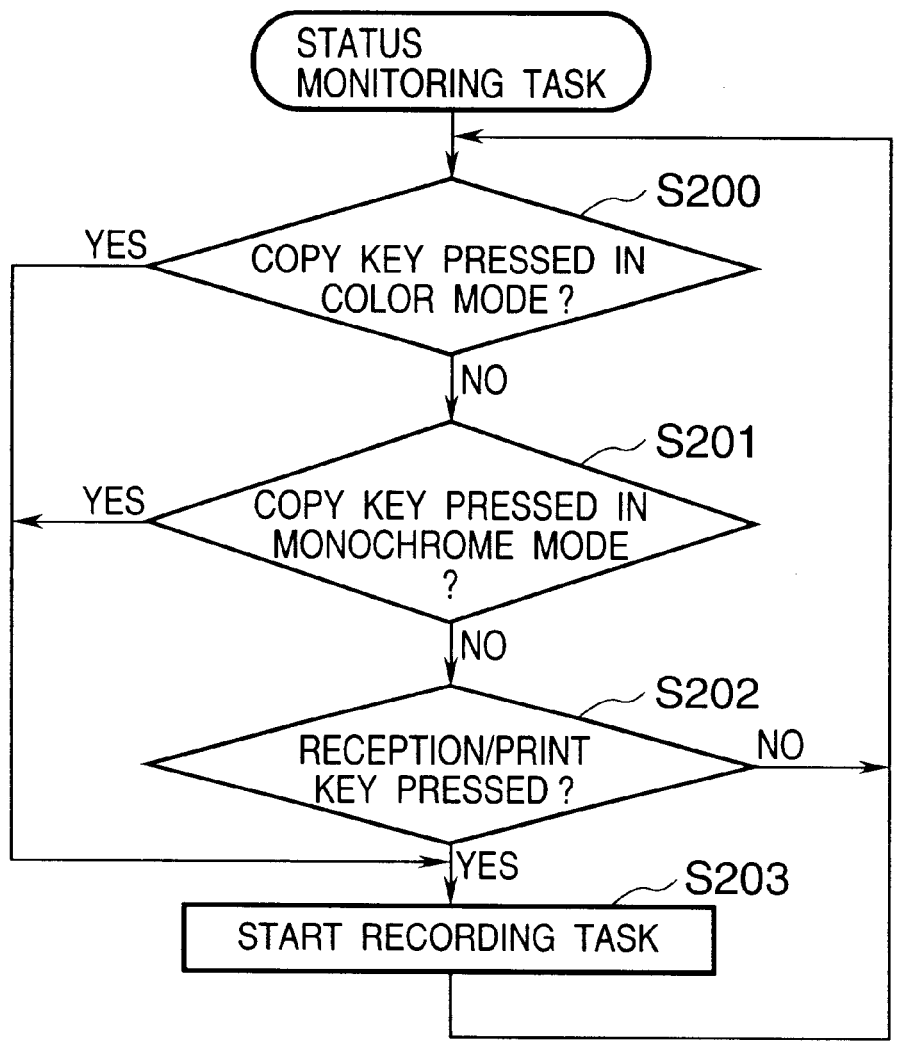
FIG. 34 is a flow chart showing a status monitoring task process in the facsimile apparatus of the second embodiment.

The operation of the status monitoring task 21 will be explained below with reference to the flow chart in FIG. 34. In the following description, monitoring of key inputs on the control panel 122 pertaining to recording operation will be explained.

It is checked in step S200 if the "copy" key 317 has been pressed with the color mode being set by the "color/monochrome" key 38. If color copying is instructed in this way, the flow advances to step S203 to confirm the presence/absence of an original and the like (not shown) and to start the recording task 29. If color copying is not instructed in step S200, the flow advances to step S201 to check if the "copy" key 317 has been pressed with the monochrome mode being set. If monochrome copying is instructed, the flow advances to step S203 to confirm the presence/absence of an original and the like (not shown) and to start the recording task 29.

If neither color copying nor monochrome copying are instructed, the flow advances to step S202 to check if the "reception/print" key 316 on the control panel 122 has been pressed. Note that the "reception/print" key 316 is used to print the received image stored in the image memory on the DRAM 118. Upon depression of the "reception/print" key 316, the flow advances to step S203 to confirm the presence/absence of an original and the like (not shown) and to start the recording task 29. On the other hand, the status monitoring task 21 informs the operate task 22 and line control task 23 of the state at the time of depression of the key.

[Recording Task]

Figure 35:
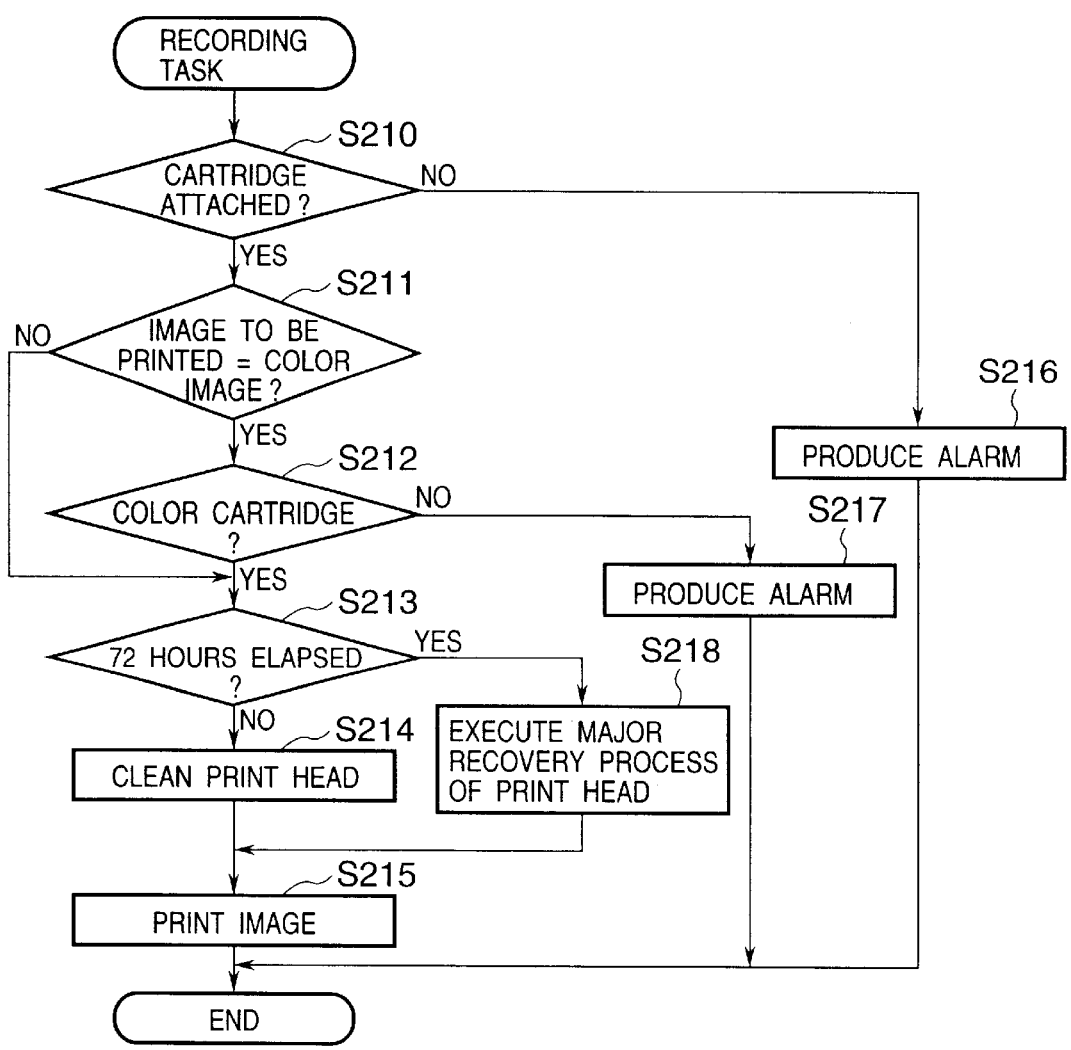
FIG. 35 is a flow chart showing a recording task process in the facsimile apparatus of the second embodiment.

The operation of the recording task 29 will be described below with reference to the flow chart in FIG. 35.

When the recording task 29 is started, it is checked based on the signal from the cartridge sensor 123 in step S210 if an ink cartridge is attached to the recording unit 120. If no ink cartridge is attached, the flow advances to step S216 to display an alarm message on the LCD display 36 or to produce a voice alarm via the loudspeaker 321 to prompt the user to attach the ink cartridge.

If the ink cartridge is attached, the flow advances to step S211 to check if an image to be recorded is a monochrome or color image. If the image to be recorded is a color image, the flow advances to step S212 to check if a color ink cartridge is attached. If the color ink cartridge is not attached, the flow advances to step S217 to display an alarm message on the LCD display 36 or to produce a voice alarm via the loudspeaker 321 to prompt the user to attach the color ink cartridge.

With such message, the user can recognize that no ink cartridge is attached, or he or she must exchange the current ink cartridge by a color ink cartridge to print a color image.

If it is determined in step S211 that the image to be recorded is not a color image, or if it is determined in step S212 that the color ink cartridge is attached, the flow advances to step S213 to check if 72 hours have elapsed after an ink jet head was used previously. Note that the elapse of time is measured by, e.g., the RTC 111. The reason why the time elapsed after the ink jet head was used previously is measured is as follows. That is, when an ink jet recording head is used, if the time elapsed after the previous use is long, the nozzles of the head readily clog due to residual ink closeby, and normal image recording may be disturbed. If it is determined in step S213 that 72 hours have elapsed, the flow advances to step S218 to execute a major recovery process of the ink jet head.

On the other hand, if it is determined in step S213 that 72 hours have not elapsed yet, the flow advances to step S214 to clean the ink jet head. Finally, the flow advances to step S215 to print an image, thus ending the processing.

As described above, according to the image communication apparatus of the second embodiment which can receive and record monochrome and color images, image recording using unintended ink can be prevented to prevent ink from being wasted, and a received color image can be recorded as a color image at a desired timing.

Whether or not a received image is recorded is automatically determined in accordance with the type of ink cartridge attached, and the type of received image, i.e., a color or monochrome image, thus providing an image communication apparatus with high operability.

Since the user is informed whether the ink cartridge attached is a monochrome or color cartridge, and whether or not the cartridge must be exchanged to record a received image, an image communication apparatus with high operability can be provided.

An image communication apparatus which does not reject image reception itself even when the type of cartridge attached does not match the received image can be provided.

An image communication apparatus, which can automatically determine compatibility between the type of cartridge and that of received image, i.e., whether a color or monochrome cartridge is attached in correspondence with a received color or monochrome image, and can appropriately record an image without any need for checking such compatibility by the user before the user instructs to record the received image, can be provided.

According to the second embodiment, upon transmitting a color image or an image having a non-standard image size, resolution, or encoding scheme in the ITU-T recommendation, since an image communication is implemented in a highly compatible standard protocol without using any non-standard protocol, image communications can be easily made between models of different manufacturers.

Also, a high-quality image can be quickly communicated with an appropriate data size corresponding to the image size to be transmitted/received, and an image communication that can facilitate image processing at the receiving apparatus can be implemented.

Furthermore, since the communication protocol can be changed depending on whether the attribute of an image to be transmitted/received is standardized in the ITU-T recommendation, the image can be communicated irrespective of whether or not the attribute of an image to be transmitted/received is standardized in agreement with the ITU-T recommendation. More specifically, when an image having at least one of a non-standard image size, resolution, or encoding scheme in the ITU-T recommendation is to be transmitted, the receiving apparatus is informed of the non-standard image size, resolution, or encoding scheme in a phase for transmitting image data, and is informed of a standard image size, resolution, and encoding scheme in the ITU-T recommendation as dummy information on a protocol signal specified by the ITU-T recommendation. Hence, a color image communication using the standard protocol can be implemented without any contradiction to the ITU-T recommendation.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus comprising:
   a communication controller, arranged to control a communication with a partner terminal;
   a memory controller, arranged to store image information received from the partner terminal in a memory;
   a recording controller, arranged to record a visible image on a recording paper sheet on the basis of the image information stored in the memory by selectively using a recording material cartridge;
   a manager, arranged to manage image information stored in the memory on the basis of identification information containing information indicating that recording has been done by said recording controller; and
   a notification controller, arranged to notify necessity of exchange of a recording material cartridge currently used by said recording controller when identification information of image information provided by said manager indicates that both color image information and monochrome image information are stored in the memory.

2. The apparatus according to claim 1, wherein said recording controller suspends start recording operation until whether or not the currently used recording material cartridge is exchanged Is selected in response to the notification.

3. The apparatus according to claim 1, wherein said communication controller transmits/receives image information to/from the partner terminal via a facsimile communication.

4. The apparatus according to claim 1, further comprising:
   a phonebook manager, arranged to store and manage phonebook data which contains telephone numbers of a plurality of partner terminals;
   a scanner which scans an original image, and output monochrome or color image information; and
   a transmitter which transmits the image information of the scanned original image to the partner terminal.

5. The apparatus according'to claim 1, wherein the recording material cartridge is a monochrome or color recording material cartridge.

6. An image communication apparatus comprising:
   a communication controller, arranged to control a communication with a partner terminal;
   a memory controller, arranged to store image information received from the partner terminal in a memory;
   a recording controller, arranged to record a visible image on a recording paper sheet on the basis of the image information stored in the memory by selectively using a recording material cartridge;
   a manager, arranged to manage image information stored in the memory on the basis of identification information containing information indicating that recording has been done by said recording controller; and
   a recording operation controller, arranged to control a recording order of image information stored in the memory by said recording on the basis of identification information of image information provided by said manager.

7. The apparatus according to claim 6, wherein said recording operation controller controls the recording order of image Information stored in the memory by said recording controller in accordance with a type of recording material cartridge currently used by said recording controller.

8. The apparatus according to claim 6, wherein said recording operation controller controls said recording controller to preferentially record a color image when said recording controller currently uses a color recording material cartridge.

9. The apparatus according to claim 6, wherein the identification information contains at least information indicating a color or monochrome image.

10. The apparatus according to claim 6, wherein said communication controller transmits/receives image information to/from the partner terminal via a facsimile communication.

11. The apparatus according to claim 6, further comprising:
    a phonebook manager, arranged to store and manage phonebook data which contains telephone numbers of a plurality of partner terminals;
    a scanner which scans an original image, and output monochrome or color image information: and
    a transmitter which transmits the image information of the scanned original image to the partner terminal.

12. The apparatus according to claim 6, wherein the recording material cartridge is a monochrome or color recording material cartridge.

13. An image communication comprising:
    a communication controller, arranged to control a communication with a partner terminal;
    a memory controller, arranged to store image information received from the partner terminal in a memory;
    a recording controller, arranged to record a visible image on a recording paper sheet on the basis of the image information stored in the memory by selectively using a recording material cartridge;
    a manager, arranged to manage image information stored in the memory on the basis of identification information containing information indicating that recording has been done by said recording controller; and
    a notification controller, arranged to notify a count value obtained by counting the number of pieces of non-recorded image information stored in the memory, and notify a count, value obtained by counting the number of pieces of color or monochrome image information stored in the memory,
    wherein said notification controller alternately notifies information that pertains to the count value of the color image information, and information that pertains to the count value of the monochrome image information.

14. The apparatus according to claim 13, wherein said notification controller comprises a counter which counts, the numbers of pieces of non-recorded color image information and monochrome image information stored in the memory, and the numbers of pieces of recorded color image information and monochrome image information stored in the memory.

15. The apparatus according to claim 13, wherein said notification controller notifies that non-recorded color or monochrome image information stored in the memory is present.

16. The apparatus according to claim 13, wherein said notification controller independently notifies a count value of color or monochrome image information stored in the memory.

17. An image communication apparatus comprising;
a communication controller, arranged to control a communication with a partner terminal;
a memory controller, arranged to store image information received from the partner terminal in a memory;
a recording controller, arranged to record a visible image on a recording paper sheet on the basis of the image information stored in the memory by selectively using a recording material cartridge;
a manager, arranged to manage image information stored in the memory on the basis of identification information containing information indicating that recording has been done, by said recording controller; and
a recording operation controller, arranged to control recording operation of image information stored in the memory by said recording controller on the basis of a count value obtained by counting the number of pieces of recorded image information stored in the memory, and identification information of image information provided by said manager;
wherein said recording operation controller controls recording operation of image information stored in the memory by said recording controller on the basis of a count value obtained by counting the number of pieces of color image information stored in the memory, and the identification information of image information provided by said manager.

18. The apparatus according to claim 17, wherein said recording operation controller controls recording operation of image information stored in the memory by said recording controller on the basis of a count value obtained by counting the number of pieces of non-recorded image information stored in the memory, and the identification information of image information provided by said manager.

19. An image communication apparatus comprising:
a communication controller, arranged to control a communication with a partner terminal;
a memory controller, arranged to store image information received from the partner terminal in a memory;
a recording controller, arranged to record a visible image on a recording paper sheet on the basis of the image information stored in the memory by selectively using a recording material cartridge;
a manager, arranged to manage image information stored in the memory on the basis of identification information containing information indicating that recording has been done by said recording controller; and
a recording operation controller, arranged to control recording operation of image information stored in the memory by said recording controller on the basis of a count value obtained by counting the number of pieces of recorded image information stored in the memory, and identification Information of image information provided by said manager;
wherein said recording operation controller controls recording operation of image information stored in the memory by said recording controller on the basis of a count value obtained by counting the number of pieces of monochrome image information stored in the memory, and the identification Information of image information provided by said manager.

20. The apparatus according to claim 19, wherein said recording operation controller controls recording operation of image information stored in the memory by said recording controller on the basis of a count value obtained by counting the number of pieces of non-recorded image information stored in the memory, and the identification information of image information provided by said manager.

21. An image communication apparatus comprising:
a communication controller, arranged to control a communication with a partner terminal;
a memory controller, arranged to store image information received from the partner terminal in a memory;
a recording controller, arranged to record a visible image on a recording paper sheet on the basis of the image information stored in the memory by selectively using a recording material cartridge;
a manager, arranged to manage image information stored in the memory on the basis of identification information containing information indicating that recording has been done by said recording a controller; and
a recording operation controller, arranged to control recording operation of image information stored in the memory by said recording controller on the basis of a count value obtained by counting the number of pieces of recorded image information stored in the memory, and identification information of image information provided by said manager;
wherein said recording operation controller controls recording operation of image information stored in the memory by said recording controller on the basis of count values obtained by respectively counting the numbers of pieces of color image information and monochrome image information stored in the memory, and the identification information of image information provided by said manager.

22. The apparatus according to claim 21, wherein said recording operation controller controls recording operation of image information stored in the memory by said recording controller on the basis of a count value obtained by counting the number of pieces of non-recorded image information stored in the memory, and the identification information of image information provided by said manager.

23. An image communication apparatus comprising:
a communication controller, arranged to control a communication with a partner terminal;
a memory controller, arranged to store image information received from the partner terminal in a memory;
a recording controller, arranged to record a visible image on a recording paper sheet on the basis of the image information stored in the memory by selectively using a recording material cartridge;
a manager, arranged to manage image information stored in the memory on the basis of identification information, containing information indicating that recording has been done by said recording controller; and a notification controller, arranged to notify a count value obtained by counting the number of pieces of recorded image information stored in the memory;

wherein said notification controller alternately notifies the information that pertains to the count value of the color image information, and the information that pertains to the count value of the monochrome image information when neither of the count values obtained by respectively counting the numbers of pieces of color image information and monochrome image information stored in the memory are zero.

24. A controlling method for controlling an image communication apparatus which has a communication controller which controls a communication with a partner terminal, a memory controller which stores image information received from the partner terminal in a memory, and a recording controller which records a visible image on a recording paper sheet on the basis of the image information stored in the memory by selectively using a recording material cartridge, method comprising the steps of:

managing Image information stored in the memory on the basis of identification information containing information indicating that recording has been done by the recording controller; and notifying necessity of exchange of a recording material cartridge currently used by the recording controller when identification information of image information provided by a management unit indicates that both color Image information and monochrome image information are stored in the memory.

25. A controlling method for controlling an image communication apparatus which has a communication controller which controls a communication with a partner terminal, a memory controller which stores image information received from the partner terminal in a memory, and a recording controller which records a visible image on a recording paper sheet on the basis of the image information stored in the memory by selectively using a recording material cartridge, method comprising the steps of:

managing image information stored in the memory on the basis of identification information containing information indicating that recording has been done by the recording controller; and controlling a recording order of image information stored in the memory by the recording controller on the basis of identification information of image information provided by a management unit.

26. A computer program product storing a computer readable medium comprising computer program code, for a method of controlling an image communication apparatus having a communication controller which controls a communication with a partner terminal, a memory controller which stores image information received from the partner terminal in a memory, and a recording controller which records a visible image on a recording paper sheet on the basis of the image information stored in the memory by selectively using a recording material cartridge, said method comprising the steps of:

managing image information stored in the memory on the basis of identification information containing information indicating that recording has been done by the recording controller; and notifying necessity of exchange of a recording material cartridge currently used by the recording controller when identification information of image information provided by 'a management unit Indicates that both color image information and monochrome image information are stored in the memory.

27. A computer program product storing a computer readable medium comprising computer program code, for a method of controlling an image communication apparatus having a communication controller which controls a communication with a partner terminal, a memory controller which stores image information received from the partner terminal in a memory, and a recording controller which records a visible image on a recording paper sheet on the basis of the image information stored in the memory by selectively using a recording material cartridge, said method comprising the steps of:

managing image information stored in the memory on the basis of identification information containing information indicating that recording has been done by the recording controller; and controlling a recording order of image information stored in the memory by the recording controller on the basis of identification information of image information provided by a management unit.

* * * * *

UNITED STATES PATENT AND TRADEMARK OFFICE
CERTIFICATE OF CORRECTION

PATENT NO. : 6,809,836 B1
DATED : October 26, 2004
INVENTOR(S) : Hiroshi Nobuta et al.

It is certified that error appears in the above-identified patent and that said Letters Patent is hereby corrected as shown below:

Column 2,
Line 41, "of:" should read -- of --.

Column 6,
Line 60, "an," should read -- an --.

Column 12,
Line 17, ", monochrome" should read -- monochrome --;
Line 20, "same .reason" should read -- same reason --; and
Line 59, "pancl" should read -- panel --.

Column 15,
Line 27, "(S 319)" should read -- (S 319). --.

Column 16,
Line 7, "ads" should read -- as --; and
Line 31, "exchange" should read -- exchanging --.

Column 17,
Line 53, "indicating." should read -- indicating --.

Column 18,
Line 18, "operation" should read -- The operation --.

Column 19,
Line 6, "scan" should read -- scan. --; and
Line 39, "Transmission/reception" should read -- Transmission/Reception --.

Column 37,
Line 45, "Is" should read -- is --; and
Line 59, "according' to" should read -- according to --.

Column 38,
Line 16, "Information" should read -- information --;
Line 37, "information:" should read -- information; --; and
Line 61, "count," should read -- count --.

Column 39,
Line 16, "comprising;" should read -- comprising: --.

UNITED STATES PATENT AND TRADEMARK OFFICE
CERTIFICATE OF CORRECTION

PATENT NO.     : 6,809,836 B1
DATED          : October 26, 2004
INVENTOR(S)    : Hiroshi Nobuta et al.

It is certified that error appears in the above-identified patent and that said Letters Patent is hereby corrected as shown below:

Column 40,
Lines 3 and 10, "Information" should read -- information --.

Column 41,
Lines 20 and 39, "method" should read -- the method --; and
Lines 21 and 29, "Image" should read -- image --.

Column 42,
Line 22, "by ' a" should read -- by a --, and "Indicates" should read -- indicates --.

Signed and Sealed this

Eighth Day of March, 2005

JON W. DUDAS
*Director of the United States Patent and Trademark Office*